United States Patent [19]

DeFeo et al.

[11] 4,257,942
[45] Mar. 24, 1981

[54] NEW WATER-INSOLUBLE AZO DYES

[75] Inventors: Francesco DeFeo, Milan; Roberto Cipolli, Novara, both of Italy

[73] Assignee: Aziende Colori Nazionali Affini Acna S.p.A., Milan, Italy

[21] Appl. No.: 949,092

[22] Filed: Oct. 6, 1978

[30] Foreign Application Priority Data

Oct. 6, 1977 [IT] Italy .............................. 28321 A/77
Nov. 14, 1977 [IT] Italy .............................. 29614 A/77

[51] Int. Cl.³ .................... C09B 29/22; C09B 31/02; C07C 107/06
[52] U.S. Cl. .................. 260/157; 260/152; 260/158; 260/187; 260/207
[58] Field of Search ............ 260/207, 152, 158, 157, 260/187; 8/41 R, 41 A, 41 B, 41 C, 41 D

[56] References Cited

U.S. PATENT DOCUMENTS

| | | | |
|---|---|---|---|
| 2,218,247 | 10/1940 | McNally | 260/206 |
| 2,633,461 | 3/1953 | Seidenfaden | 260/207 |
| 3,009,909 | 11/1961 | Kaeding | 260/207 |
| 3,507,850 | 4/1970 | Cohen | 260/187 |
| 3,962,209 | 6/1976 | Gotteschlich et al. | 260/207.1 |
| 4,026,914 | 5/1977 | Zirngibl | 260/207 |

Primary Examiner—John F. Niebling

[57] ABSTRACT

The present invention relates to the synthesis of new dyes having the following general formula:

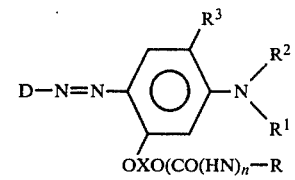

wherein:
D is the residue of a diazotizable component of the carbocyclic or heterocyclic series
X is an ethylene group, optionally substituted by halogen-methyl, alkyl $C_1$–$C_4$, aryl, aralkyl or $CH_2OCO(HN)_nR$ (wherein R and n have the meanings hereinafter defined);
R is alkyl $C_1$–$C_8$ optionally substituted by halogen, CN, COOH; aryl optionally substituted by one or more atoms of halogen, alkyl $C_1$–$C_4$, alkoxyl $C_1$–$C_4$; alkoxyl $C_1$–$C_4$; alkoxyl $C_1$–$C_8$; Aryloxy; aralkoxy; cycloalkoxy; aralkyl; naphthyl optionally substituted by halogen; alkenyl $C_2$–$C_8$, optionally substituted by halogen, CN, COOH;
$R^1$ and $R^2$, either like or unlike each other, may be alkyl $C_1$–$C_4$ optionally substituted by halogen or CN groups; aralkyl;
$R^3$ is H; halogen, alkyl $C_1$–$C_4$; alkoxyl $C_1$–$C_4$, optionally substituted.
n is 0 or 1.

65 Claims, No Drawings

NEW WATER-INSOLUBLE AZO DYES

This invention relates to the synthesis of a new series of azo dyes and to the application thereof on textile materials.

More in particular, the present invention relates to the synthesis of new dyes having the following general formula:

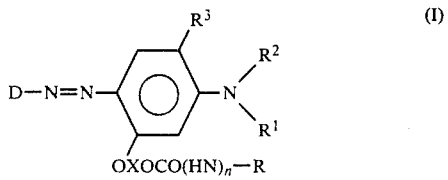

wherein:
- D is the residue of a diazotizable component of the carbocyclic or heterocyclic series and may have substituents such as: halogen; trifluoromethyl; CN; $NO_2$; alkyl $C_1$-$C_4$; NHCO alkyl $C_1$-$C_4$; $SO_2$ alkyl $C_1$-$C_4$; $SO_2NH_2$; $SO_2NH$ alkyl $C_1$-$C_4$; $SO_2N$ (alkyl $C_1$-$C_4$)$_2$; $SO_2NH$ phenyl; hydroxyethoxy; chloro-ethoxy; methoxy-ethoxy; COO alkyl $C_1$-$C_4$; COO cycloalkyl; phenyl; phenoxy; phenylazo or naphthylazo;
- X is an ethylene group, optionally substituted by halogen-methyl, alkyl $C_1$-$C_4$, aryl, aralkyl or $CH_2OCO(HN)_nR$ (wherein R and n have the meanings hereinafter defined);
- R is alkyl $C_1$-$C_8$ optionally substituted by halogen, CN, COOH; aryl optionally substituted by one or more atoms of halogen, alkyl $C_1$-$C_4$, alkoxyl $C_1$-$C_4$; alkoxyl $C_1$-$C_8$; aryloxy; aralkoxy; cicloalkoxy; aralkyl, naphtyl optionally substituted by halogen; alkenyl $C_2$-$C_8$, optionally substituted by halogen, CN, COOH;
- $R^1$ and $R^2$, either like or unlike each other, may be alkyl $C_1$-$C_4$ optionally substituted by halogen or CN groups; aralkyl;
- $R^3$ is H; halogen; alkyl $C_1$-$C_4$; alkoxyl $C_1$-$C_4$, optionally substituted.
- n is 0 or 1.

The azo dyes of general formula (I) are prepared according to conventional techniques, by diazotizing in an acid medium an amine of general formula:

$$D-NH_2 \quad (II)$$

and by coupling, in an aqueous medium having preferably a pH=4-5, the diazo so obtained with a derivative of general formula:

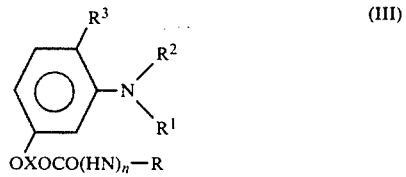

wherein D, X, R, $R^1$, $R^2$, $R^3$ and n have the meanings defined hereinbefore.

An alternative method of preparing the dyes of formula (I) wherein n is 1 may consist in condensing the dyes of general formula:

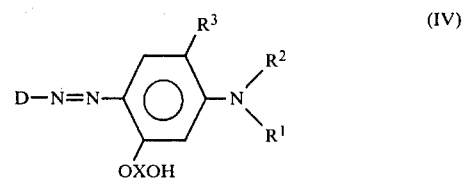

with the corresponding reagents of general formula:

$$O=C=N-R$$

in the presence of inert solvents.

D, X, R, $R^1$, $R^2$ and $R^3$ have the same meanings as defined hereinbefore.

An alternative method for preparing the dyes of formula (I) wherein n is zero, may consist, for example, in condensing the dyes of general formula (IV) with the corresponding reagents of general formulae:

| $R^4COCl$ | $R^4COOCH_3$ | $R^4COOC_2H_5$ |
|---|---|---|
| (V) | (VI) | (VIa) |
| $(R^5CO)_2O$ | $R^6OOCCl$ | |
| (VII) | (VIII) | | wherein D, X, $R^1$, $R^2$ and $R^3$ have the meanings specified hereinbefore, and:
- $R^4$ is alkyl $C_1$-$C_8$ optionally substituted by halogen or CN; optionally substituted aryl; aralkyl;
- $R^5$ is alkyl $C_1$-$C_8$; together they may be an arylene residue or a saturated or unsaturated aliphatic bridge;
- $R^6$ is alkyl $C_1$-$C_8$ optionally substituted by halogen or methoxy; optionally substituted aryl; aralkyl; cycloalkyl.

The reaction between the intermediates of general formula (IV) and the reagents of general formulae (V) to (VIII) are usually conducted in the presence of aprotic solvents such as, for example, benzene, toluene, xylene, chlorobenzene, ortho-dichlorobenzene, pyridine, dimethylformamide, dimethyl-sulphoxide, at temperatures ranging from 0° to 140° C., in the presence or in the absence of basic catalysts, such as, e.g., pyridine, or of acceptors of acids, such as, e.g., triethylamine.

Diazo components of the carbocyclic series that can be advantageously utilized are: 4-nitro-aniline, 3-nitroaniline, 2-chloro-4-nitro aniline, 2,4-dinitro-aniline, 2-cyano-4-nitro aniline, 2,4-dinitro-6-bromo aniline, 2,6-dibromo-4-nitro aniline, 2-bromo-4-nitro-6-cyano aniline, 2,6-dichloro-4-nitro aniline, 2-methyl-4-chloro aniline, 2-methyl-3-chloro aniline, 2,5-dichloro aniline, 3,4-dichloro aniline, 3-chloro aniline, 2,4,5-trichloro aniline, 2,4,6-trichloro aniline, 2-chloro-4-methylsulphonyl aniline, 2,5-dichloro-4-methylsulphonyl aniline, 4-chloro-6-methylsulphonyl-2-toluidine, 4-nitro-2-methylsulphonyl aniline, 4-methylsulphonyl aniline, 2,6-dibromo-4-ethylsulphonyl aniline, 2-cyano-5-chloro aniline, 2-methoxy-4-chloro aniline, 2-anisidine, 2-toluidine, butyl anthranilate, 4amine ethyl benzoate, 2-trifluoro-methyl-4-chloro aniline, 2-methylsulphonyl-4-chloro aniline, 2-phenoxy-4-nitro-aniline, 2,5-dichloro-4-dimethylamido sulphonyl-aniline, 2-methoxy-4-nitro aniline, 2-amino-5-nitro ethyl benzoate, 2-cyano-4,6- dinitro aniline, 2-chloro-4-cyano aniline, 3-amino acetanilide, 2,6-dicyano-4-nitroaniline, 2,6-dicyano-4-amino butyl benzoate, 4-amino azobenzene, 4-amino azotoluene, 4-phenylazo-2-anisidine, 4-phenylazo-2,5-dimethylaniline, 4-(4'-nitro phenylazo)-2,5-dimethylaniline, 2,3'-dimethyl-4-amino azobenzene, 2,3'-dichloro-4-amino azobenzene, 4-(2'-methoxy phenylazo)2,5-dimethylaniline, 4-amino phthalimide, 4-amino naphthalimide, alpha-amino anthraquinone, beta-aminoanthraquinone.

Particularly useful as diazo components of the heterocyclic series are: 2-aminothiazole, 2-amino-5-nitro thiazole, 2-amino-4-methylthiazole, 2-amino-4-phenylthiazole, 2-amino-4,5-thiazoldicarboxyamide, ethyl ester of 5-amino-3-phenyl-2-thiazolcarboxylic acid, 3-(4-aminophenyl)-5-phenyl-1,2,4-oxadiazole, 3-amino pyridine, 8-amino-quinoline, 3-amino pyrazole, 3-amino-1-phenyl pyrazole, 3-amino indazole, 3-amino-1,2,4-triazole, 2-amino benzothiazole, 2-amino-6-methyl benzothiazole, 2-amino-6-chlorobenzothiazole, 2-amino-6-nitro benzothiazole, 2-amino-6-methylsulphonyl benzothiazole, 2-amino-6-ethoxy benzothiazole, 2-amino-1,3,4-thiadizole, 2-amino-1,3,5-thiadizole, 3-amino-5-nitro-2,1-benzo isothiazole, 2-amino-3-cyano thiophene, methyl ester of 5-amino-4-cyano-3-methyl-2-thiophenecarboxylic acid, diethyl ester of 5amino-3-methyl-2,4-thiophene-dicarboxylicacid, 3-amino-2-benzothiophene-carbonitrile, 3-amino-2-benzothiophene-carboxyamide, 3-amino-2-benzothiophene-carboxylic acid and esters thereof.

The azo dyes of the present invention are applicated in the dyeing and printing of synthetic polymeric materials such as, for example, polyesters, polyamides, polyacrylonitrile and cellulose esters, in any form.

Dyeing can be carried out in aqueous or solvent baths, and printing can be the conventional one or the transfer printing.

The dyes of general formula (I) provide shades varying from yellow to blue and generally possess a good affinity for the above-mentioned fibers and good stabilities to sunlight, washing and sublimation.

The following examples are given to illustrate the characteristics of the present invention, without being however a limitation thereof. The stability tests were conducted in accordance with the UNI standards. Unless otherwise specified, the term "parts" is to be understood as expressed in weight unit.

EXAMPLE 1

1.38 parts of p-nitro aniline were dissolved in 4.0 ml of HCl, d=1.18, and 30 ml of water.

It was diazotized at 5°-10° C. by gradually adding a solution of 0.69 parts of sodium nitrite in 10 ml of water. The diazo solution, after clarification, was poured at 5°-10° C. into a solution of 3.3 parts of the intermediate:

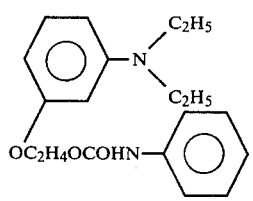

in 20 ml of acetic acid and 50 ml of water.

During the coupling the pH was kept =4–5 by addition of sodium acetate in crystals.

After a 30-minute stirring at 5°-10° C. it was filtered, the precipitate was washed with water, and it was dried. 4.5 parts of the dye:

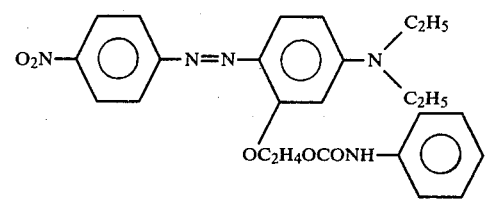

were recovered as a dark red powder which dyed red the synthetic fibres, in particular polyester fibres, cellulose acetate, polyamide fibres and polyacrylic fibres, with good stabilities to sunlight, moisture and sublimation.

EXAMPLE 2

1.83 parts of 2,4-dinitro aniline were added, at 0°-5° C. and in 1 hour, to a solution consisting of 0.69 parts of sodium nitrite and of 20 ml of $H_2SO_4$, d=1.84.

After stirring for 30 minutes the diazo solution was poured at 5°-10° C. into a solution made up of 3.3 parts of the intermediate of example 1 in 20 ml of acetic acid and 50 ml of water. During the coupling the pH was maintained =4–5 by addition of sodium acetate in crystals.

After stirring for 30 minutes at 5°-10° C. it was filtered and the precipitate was washed with water. By drying of the cake, 4.0 parts of the dye:

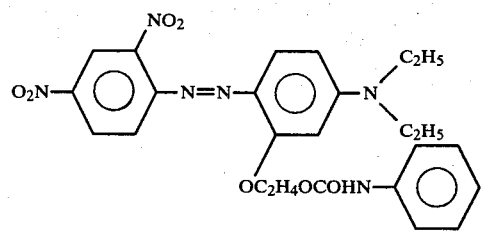

were recovered as a violet powder that dyed—the above-mentioned fibres violet.

EXAMPLE 3

2.29 parts of 2-cyano-5-chloro aniline were diazotized and coupled with 4.92 parts of the intermediate of example 1, according to the modalities specified in example 2.

5.8 parts of the dye:

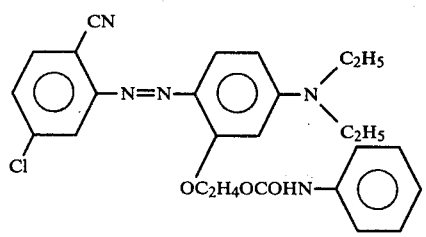

were recovered in the form of a scarlet powder that dyed the above-mentioned fibres orange-red.

EXAMPLE 4

2.29 parts of 2-cyano-5-chloro aniline were diazotized according to the process described in example 2 and coupled with 4.62 parts of the intermediate:

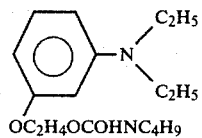

dissolved in 20 ml of acetic acid and 50 ml of water.

By operating according to example 1, 5.4 parts of the dye:

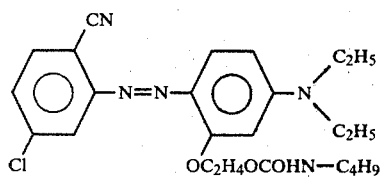

were recovered as a scarlet powder that dyed the above-said fibres orange-red.

EXAMPLE 5

1.38 parts of p-nitro aniline were diazotized and coupled with 3.08 parts of the intermediate of example 4, according to the modalities of example 1.

4.4 parts of the dye:

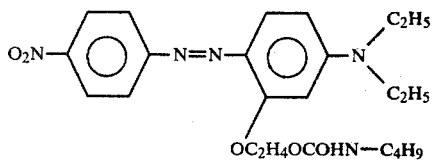

were recovered as a red powder which dyed the above-mentioned fibres red.

EXAMPLE 6

1.38 parts of p-nitro aniline were diazotized according to the modalities of example 1 and coupled with 3.42 parts of the intermediate:

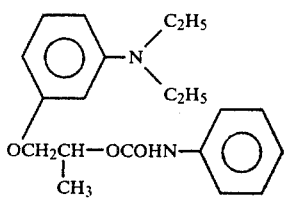

solubilized in 20 ml of acetic acid and 50 ml of water. By operating according to example 1, 4.4 parts of the dye:

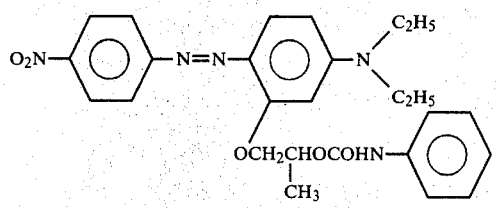

were recovered as a red powder which dyed the above-said fibres red.

EXAMPLE 7

2.29 parts of 2-cyano-5-chloro aniline were diazotized according to the modalities specified in example 2 and were coupled with 5.96 parts of the intermediate:

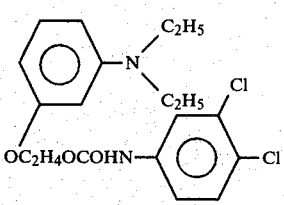

in 20 ml of acetic acid and 50 ml of water.

It was then operated according to example 2, thus recovering 7.3 parts of the dye:

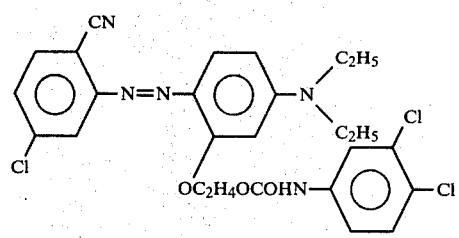

as a scarlet powder which dyed the above-cited fibres orange-red.

EXAMPLE 8

1.38 parts of p-nitro aniline were diazotized and coupled with 3.97 parts of the intermediate of example 7 according to the modalities of example 1.

5.3 parts of the dye:

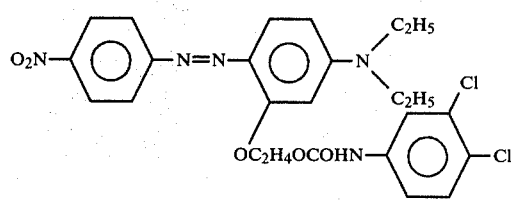

were recovered as a red powder that dyed the above-said fibres red.

EXAMPLE 9

1.38 parts of m-nitro aniline were diazotized and coupled with 3.3 parts of the intermediate of example 1 following the modalities of example 1.

4.25 parts of the dye:

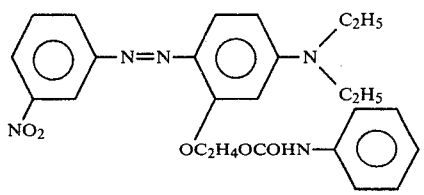

were recovered in the form of an orange powder which dyed the above-mentioned fibres orange.

EXAMPLE 10

1.62 parts of 2,5-dichloro aniline were hot treated with 4.0 ml of HCl d=1.18 and with 30 ml of water. After cooling of the solution to 5°–10° C., 0.69 parts of sodium nitrite in 10 ml of water were gradually added thereto.

The diazo solutin was then clarified and poured, at 5°–10° C., into a solution of 3.3 parts of the intermediate of example 1 in 20 ml of acetic acid and 50 ml of water. It was then operated as described in example 1, thus recovering 4.7 parts of the dye:

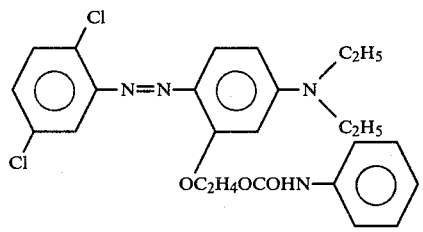

as a yellow powder which dyed the above-mentioned fibres yellow.

EXAMPLE 11

A solution of 0.82 parts of 2-cyano-4-nitro aniline in 10 parts of acetic acid, 2 parts of propionic acid and 1 part of water was cooled down to 5°–10° C., whereupon it was gradually additioned with 5.5 ml of 1 N nitrosyl sulphuric acid. After further stirring for about 1 hour at 5°–10° C., the diazo solution was gradually poured into a solution, at 5°–10° C., consisting of 1.6 parts of the intermediate of example 4 in 10 ml of acetic acid and 30 ml of water. During the coupling the pH was kept=4–5 by addition of sodium acetate in crystals.

After a 1-hour stirring at 5°–10° C. it was filtered and the precipitate was washed with water. By drying of the cake it was possible to recover 1.9 parts of the dye:

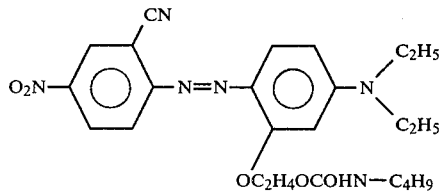

as a violet powder which dyed the above-mentioned fibres violet.

EXAMPLE 12

A solution of 2.4 parts of 2,5-dichloro-4-methylsulphonyl-aniline in 15 ml of $H_2SO_4$ d=1.84 was cooled to 5°–10° C. and then gradually additioned with 10 ml of 1 N nitrosyl sulphuric acid.

The diazo solution was poured into 3.42 parts of the intermediate of example 6 in 20 ml of acetic acid and 50 ml of water. It was then operated according to example 1 and 5.25 parts of the dye:

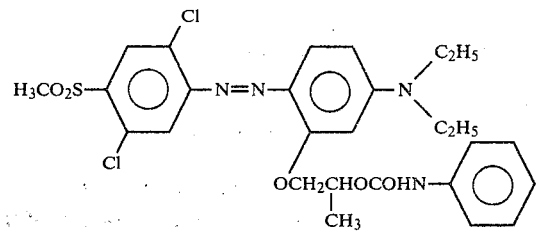

were recovered as a red powder which dyed the above-mentioned fibres red.

EXAMPLE 13

2.62 parts of 2,4- dinitro-6-bromo-aniline were diazotized and coupled with 3.3 parts of the intermediate of example 1 according to the procedure described in example 2. 4.9 parts of the dye:

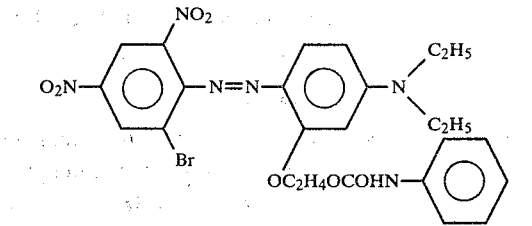

were recovered as a violet powder which dyed the above-mentioned fibres bluish violet.

EXAMPLE 14

1.96 parts of the methyl ester of 5-amino-4-cyano-3-methyl-2-thiophencarboxylic acid were diazotized at 0°–5° C. by adding them in about 1 hour to a solution of 0.69 parts of sodium
nitrite in 20 ml of $H_2SO_4$ d=1.84.

By operating as described in example 1, it was coupled with 3.3 parts of the intermediate of example 1. 5.2 parts of the dye:

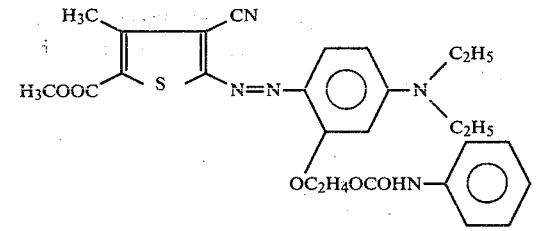

were recovered as a violet powder which dyed the abovesaid fibres violet.

EXAMPLE 15

1.86 parts of 2-amino-4,5-thiazole-dicarboxyamide were diazotized and couled, according to the modalities of examples 2, with 3.3 parts of the intermediate of example 1.

2.9 parts of the dye:

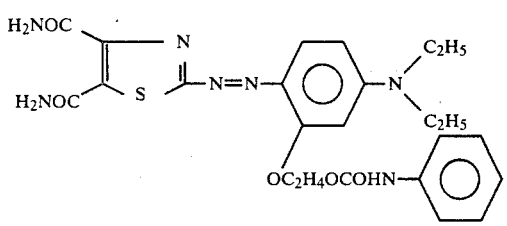

were recovered as a red powder which dyed the above-mentioned fibres red.

EXAMPLE 16

2.48 parts of the ethyl ester of 5-amino-3-phenyl-2-thiazole-carboxylic acid were diazotized and coupled, according to the modalities of example 2, with 3.97 parts of the intermediate of example 7.

6.1 parts of the dye:

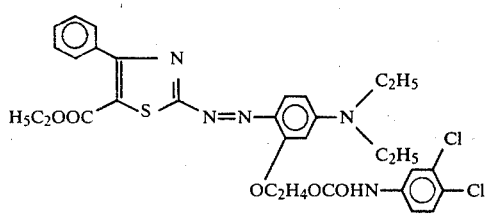

were recovered in the form of a red-violet powder which dyed the abovesaid fibres ruby.

EXAMPLE 17

2.37 parts of 3-(p-aminophenyl)-5-(phenyl)-1,2,4-oxadiazole were diazotized and coupled with 3.08 parts of the intermediate of example 4 according to the modalities of example 2. 4.7 parts of the dye:

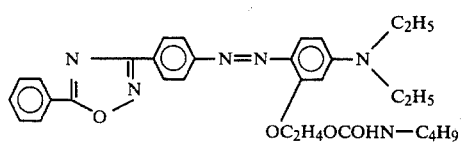

were recovered as an orange powder which dyed the above-mentioned fibres orange.

EXAMPLE 18

1.45 parts of 2-amino-5-nitro thiazole were batchwise added to 10 ml of $H_2SO_4$ d=1.84 cooled down to 0°–5° C.

Into the resulting mixture, 5 ml of 2 N nitrosyl sulphuric acid were added dropwise, whereupon the whole was further stirred 3 hours at 0°–5° C.

The diazo solution was then poured under stirring into 3.3 parts of the intermediate of example 1 dissolved in dilute sulphuric acid. During the coupling the pH was gradually brought to a valve of 4–5 by addition of a concentrated solution of sodium acetate.

After a further 2-hour stirring it was filtered, the precipitate was repeatedly washed with water and then dried. 3.2 parts of the dye:

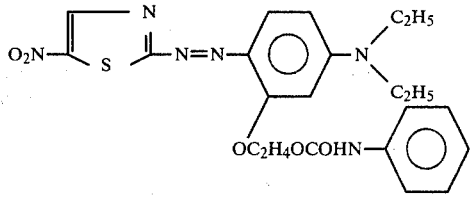

were recovered as a blue powder which dyed the above-mentioned fibres blue.

EXAMPLE 19

1.45 parts of 2-amino-5-nitro thiazole were diazotized and coupled, according to the modalities of example 18, with 3.08 parts of the intermediate of example 4.

3.05 parts of the dye:

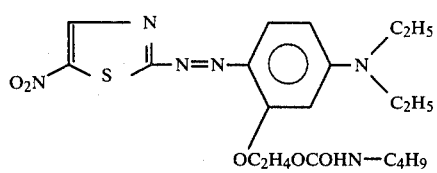

were recovered as a blue powder which dyed the aforesaid fibres reddish blue.

EXAMPLE 20

2.12 parts of 4-amino-1,8-naphthalimide were diazotized and coupled, according to the modalities of example 2, with 3.3 parts of the intermediate of example 1. 4.75 parts of the dye:

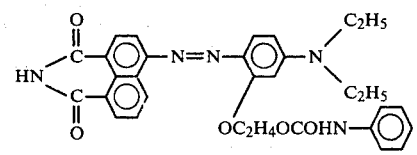

were recovered as a violet powder which dyed the above-mentioned fibres violet.

EXAMPLE 21

2.25 parts of p-amino azo-toluene were treated, at the boiling temperature, with 10 ml of HCl d=1.18 and with 25 ml of water. After cooling to 5°–10° C. and dilution of the mass, it was diazotized by gradually adding thereto 0.69 parts of sodium nitrite in 10 ml of water.

After a further 1-hour stirring, the diazo solution was clarified and poured at 5°–10° C. into a solution of 3.3 parts of the intermediate of example 1 in 20 ml of acetic acid and 50 ml of water.

It was then operated as described in example 1 and 4.2 parts of the dye:

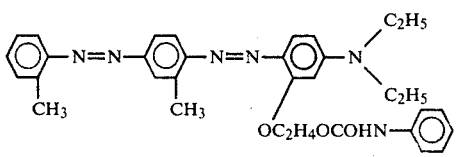

were recovered as a red powder which dyed the above-mentioned fibres red.

EXAMPLE 22

1.42 parts of 2-methyl-3-chloro aniline were diazotized and coupled, according to the modalities of example 1, with 2.1 parts of the intermediate:

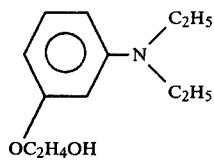

in 20 ml of acetic acid and 50 ml of water. By successively operating in accordance with example 1, it was possible to recover 3.4 parts of the intermediate dye:

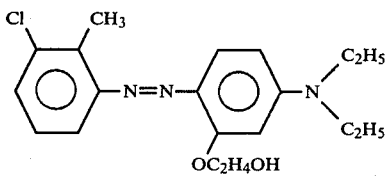

2.7 parts of such dye were reacted, at 80° C. for about 8 hours, with 0.93 parts of phenylisocyanate and 10 ml of orthodichlorobenzene. At the conclusion of the reaction, the mass was allowed to cool down, whereupon it was filtered and dried. 3.45 parts of the dye:

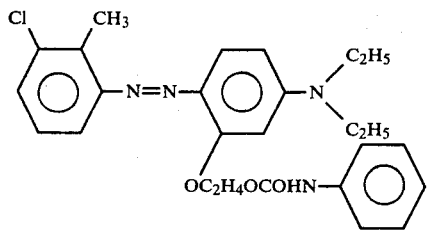

were recovered as a yellow powder which dyed the above-mentioned fibres yellow.

EXAMPLE 23

0.6 parts of the dye of example 1, previously microfined, were added to a dyeing bath at 40° C. containing 100 parts of a polyester yarn. The pH was brought to 5 with acetic acid whereupon, employing a bath ratio = 1:15, the bath was gradually heated to 130°–135° C. and dyeing was carried out at such temperature for 1 hour. After cooling, the bath was discharged and the dyed material was subjected to the usual reducing alkaline cleaning treatment. The dye exhibited a red shade and was characterized by good stabilities to moisture, sunlight and sublimation. By operating similarly to what described in the preceding examples, the following azo dyes of general formula (I) wherein n is 1 were obtained.

| Ex. No. | D—$NH_2$ | R | $R^1$ | $R^2$ | $R^3$ | X | Shade |
|---|---|---|---|---|---|---|---|
| 24 | 3-chloro aniline | $C_6H_5$ | $C_2H_5$ | $C_2H_5$ | H | $C_2H_4$ | yellow |
| 25 | 2-chloro-4-nitro aniline | $C_6H_5$ | $C_2H_5$ | $C_2H_5$ | H | $C_2H_4$ | ruby |
| 26 | 2-chloro-4-methyl sulphonyl aniline | $C_6H_5$ | $C_2H_5$ | $C_2H_5$ | H | $C_2H_4$ | scarlet |
| 27 | 4-chloro-6-methylsulphonyl-2-toluidine | $C_6H_5$ | $C_2H_5$ | $C_2H_5$ | H | $C_2H_4$ | orange |
| 28 | 2,6-dibromo-4-nitro aniline | $C_6H_5$ | $C_2H_5$ | $C_2H_5$ | H | $C_2H_4$ | violet |
| 29 | 4-nitro-2-methylsulphonyl aniline | $C_6H_5$ | $C_2H_5$ | $C_2H_5$ | H | $C_2H_4$ | violet |
| 30 | 2,4-dinitro aniline | $C_4H_9$ | $C_2H_5$ | $C_2H_5$ | H | $C_2H_4$ | violet |
| 31 | 2-bromo-4-nitro-6-cyano aniline | $C_4H_9$ | $C_2H_5$ | $C_2H_5$ | H | $C_2H_4$ | violet |
| 32 | 2,5-dichloro aniline | $C_4H_9$ | $C_2H_5$ | $C_2H_5$ | H | $C_2H_4$ | yellow |
| 33 | 4-methylsulphonyl aniline | $C_4H_9$ | $C_2H_5$ | $C_2H_5$ | H | $C_2H_4$ | orange |
| 34 | 3-nitro aniline | $C_4H_9$ | $C_2H_5$ | $C_2H_5$ | H | $C_2H_4$ | orange |
| 35 | 3,4-dichloro-aniline | 3,4-$C_6H_3Cl_2$ | $C_2H_5$ | $C_2H_5$ | H | $C_2H_4$ | gold yellow |
| 36 | 2-chloro-4-nitro aniline | 3,4-$C_6H_3Cl_2$ | $C_2H_5$ | $C_2H_5$ | H | $C_2H_4$ | ruby |
| 37 | 2-amino-5-nitro thiazole | 3,4-$C_6H_3Cl_2$ | $C_2H_5$ | $C_2H_5$ | H | $C_2H_4$ | blue |
| 38 | 2-amino-6-methoxy-benzothiazole | 3,4-$C_6H_3Cl_2$ | $C_2H_5$ | $C_2H_5$ | H | $C_2H_4$ | violet |
| 39 | 4-nitro aniline | $C_6H_5$ | $CH_3$ | $CH_3$ | H | $C_2H_4$ | red |
| 40 | 4-nitro aniline | $C_6H_5$ | $C_4H_9$ | $C_4H_9$ | H | $C_2H_4$ | red |
| 41 | 4-nitro aniline | $C_6H_5$ | $C_2H_4CN$ | $C_2H_4CN$ | H | $C_2H_4$ | red |
| 42 | 4-nitro aniline | $C_6H_5$ | $C_2H_4Cl$ | $C_2H_4Cl$ | H | $C_2H_4$ | red |
| 43 | 4-nitro aniline | $C_6H_5$ | $CH_3$ | $CH_2C_6H_5$ | H | $CH_2CH(CH_3)$ | red |
| 44 | 4-nitro aniline | $C_6H_5$ | $C_2H_5$ | $C_2H_4CN$ | H | $CH_2CH(CH_3)$ | red |
| 45 | 4-nitroaniline | $C_6H_5$ | $C_3H_7$ | $C_3H_7$ | H | $CH_2CH(CH_3)$ | red |
| 46 | 4-nitro aniline | $C_4H_9$ | $CH_3$ | $CH_3$ | H | $C_2H_4$ | red |
| 47 | 4-nitro aniline | $C_4H_9$ | $C_2H_4CN$ | $C_2H_4CN$ | H | $CH_2CH(CH_3)$ | red |
| 48 | 4-nitro aniline | $C_4H_9$ | $C_2H_4Cl$ | $C_2H_4Cl$ | H | $CH_2CH(CH_3)$ | red |
| 49 | 4-nitro aniline | 3,4-$C_6H_3Cl_2$ | $CH_3$ | $CH_3$ | H | $C_2H_4$ | red |
| 50 | 4-nitro aniline | 3,4-$C_6H_3Cl_2$ | $CH_3$ | $CH_2C_6H_5$ | H | $C_2H_4$ | red |
| 51 | 4-nitro aniline | 3,4-$C_6H_3Cl_2$ | $C_2H_5$ | $C_2H_5$ | Cl | $C_2H_4$ | ruby |
| 52 | 4-nitro aniline | $C_6H_5$ | $C_2H_5$ | $C_2H_5$ | Cl | $C_2H_4$ | ruby |
| 53 | 4-nitro aniline | $C_6H_5$ | $C_2H_5$ | $C_2H_5$ | Cl | $CH_2CH(CH_3)$ | ruby |
| 54 | 4-nitro aniline | $C_4H_9$ | $C_2H_5$ | $C_2H_5$ | Cl | $C_2H_4$ | ruby |
| 55 | 4-nitro aniline | $C_6H_5$ | $C_2H_5$ | $C_2H_5$ | $OCH_3$ | $C_2H_4$ | violet |
| 56 | 4-nitro aniline | $C_6H_5$ | $C_2H_5$ | $C_2H_4CN$ | $OCH_3$ | $C_2H_4$ | violet |
| 57 | 4-nitro aniline | $C_6H_5$ | $C_2H_5$ | $C_2H_5$ | $OC_2H_4Cl$ | $C_2H_4$ | violet |
| 58 | 4-nitro aniline | $C_6H_5$ | $C_2H_4CN$ | $C_2H_4CN$ | $OCH_3$ | $CH_2CH(CH_3)$ | violet |
| 59 | 4-nitro aniline | $C_6H_5$ | $C_2H_4Cl$ | $C_2H_4Cl$ | $OCH_3$ | $CH_2CH(CH_3)$ | violet |
| 60 | 4-nitro aniline | $C_4H_9$ | $CH_3$ | $CH_2C_6H_5$ | $OCH_3$ | $C_2H_4$ | violet |
| 61 | 4-nitro aniline | $C_4H_9$ | $CH_3$ | $CH_2C_6H_5$ | $OC_2H_4Cl$ | $C_2H_4$ | violet |
| 62 | 4-nitro aniline | $C_4H_9$ | $C_2H_5$ | $C_2H_5$ | $OC_2H_5$ | $CH_2CH(CH_3)$ | violet |

-continued

| Ex. No. | D—NH$_2$ | R | R$^1$ | R$^2$ | R$^3$ | X | Shade |
|---|---|---|---|---|---|---|---|
| 63 | 4-nitro aniline | 4-C$_6$H$_4$Cl | CH$_3$ | CH$_3$ | OCH$_3$ | C$_2$H$_4$ | violet |
| 64 | 4-nitro aniline | 4-C$_6$H$_4$CH$_3$ | C$_2$H$_5$ | C$_2$H$_5$ | H | C$_2$H$_4$ | red |
| 65 | 4-nitro aniline | 4-C$_6$H$_4$OCH$_3$ | C$_2$H$_5$ | C$_2$H$_5$ | H | C$_2$H$_4$ | red |
| 66 | 2-amino-6-ethoxy benzothiazole | C$_6$H$_5$ | CH$_3$ | CH$_3$ | H | C$_2$H$_4$ | violet |
| 67 | 2-amino-5-nitro thiazole | C$_6$H$_5$ | CH$_3$ | CH$_3$ | OCH$_3$ | CH$_2$CH(CH$_3$) | blue |
| 68 | 2-amino-5-nitro thiazole | C$_4$H$_9$ | C$_2$H$_4$CN | C$_2$H$_4$CN | Cl | C$_2$H$_4$ | blue |
| 69 | 2-amino-thiazole | C$_4$H$_9$ | C$_2$H$_4$Cl | C$_2$H$_4$Cl | OCH$_3$ | C$_2$H$_4$ | red |
| 70 | 2-chloro-4-methylsulphonyl aniline | C$_4$H$_9$ | CH$_3$ | CH$_2$C$_6$H$_5$ | Cl | C$_2$H$_4$ | red |
| 71 | 2-cyano-5-chloro-aniline | 4-C$_6$H$_4$CH$_3$ | C$_2$H$_5$ | C$_2$H$_5$ | OC$_2$H$_5$ | C$_2$H$_4$ | ruby |
| 72 | 2,4-dinitro aniline | 3,4-C$_6$H$_3$Cl$_2$ | CH$_3$ | CH$_3$ | Cl | C$_2$H$_4$ | violet-blue |
| 73 | 2,5-dichloro-4-methylsulphonyl aniline | 4-C$_6$H$_4$Cl | C$_2$H$_4$CN | C$_2$H$_4$CN | H | CH$_2$CH(CH$_3$) | red |
| 74 | 2-methoxy-4-chloro aniline | 3,4-C$_6$H$_3$Cl$_2$ | C$_2$H$_5$ | C$_2$H$_5$ | OC$_4$H$_9$ | C$_2$H$_4$ | red |
| 75 | o-anisidine | C$_6$H$_5$ | C$_2$H$_4$CN | C$_2$H$_4$CN | H | C$_2$H$_4$ | yellow |
| 76 | o-toluidine | C$_6$H$_5$ | CH$_3$ | CH$_2$C$_6$H$_5$ | OCH$_3$ | CH$_2$CH(CH$_3$) | orange |
| 77 | 2-chloro-4-nitro aniline | C$_6$H$_5$ | C$_3$H$_7$ | C$_3$H$_7$ | Cl | C$_2$H$_4$ | violet |
| 78 | 2-chloro-4-nitro aniline | C$_6$H$_5$ | C$_3$H$_7$ | C$_3$H$_7$ | OCH$_3$ | CH$_2$CH(CH$_3$) | violet |
| 79 | 3-nitro aniline | 4-C$_6$H$_4$Cl | C$_2$H$_5$ | C$_2$H$_5$ | Cl | C$_2$H$_4$ | scarlet |
| 80 | ethyl anthranilate | 4-C$_6$H$_4$Cl | C$_2$H$_5$ | C$_2$H$_5$ | Cl | CH$_2$CH(CH$_3$) | orange |
| 81 | 2-amino-5-nitro thiazole | 4-C$_6$H$_4$CH$_3$ | C$_2$H$_5$ | C$_2$H$_4$CN | H | C$_2$H$_4$ | blue |
| 82 | 2-amino-6-methyl sulphonyl-benzo-thiazole | 4-C$_6$H$_4$CH$_3$ | C$_2$H$_5$ | C$_2$H$_5$ | OCH$_3$ | C$_2$H$_4$ | blue |
| 83 | 4-amino azo benzene | C$_6$H$_5$ | C$_2$H$_5$ | C$_2$H$_5$ | H | C$_2$H$_4$ | red |
| 84 | 4-phenyl azo-2 methoxy aniline | C$_4$H$_9$ | C$_2$H$_5$ | C$_2$H$_5$ | H | C$_2$H$_4$ | red |
| 85 | 4-phenyl azo-2,5-dimethyl aniline | C$_4$H$_9$ | C$_2$H$_5$ | C$_2$H$_5$ | H | C$_2$H$_4$ | ruby |
| 86 | 1-phenyl-3-amino pyrazole | C$_6$H$_5$ | C$_2$H$_5$ | C$_2$H$_5$ | H | C$_2$H$_4$ | yellow |
| 87 | 8-amino quinoline | C$_6$H$_5$ | C$_2$H$_5$ | C$_2$H$_5$ | H | C$_2$H$_4$ | orange |

EXAMPLE 88

2.92 parts of 2,6-dibromo-4-nitro aniline were diazotized according to the modalities illustrated in example 2 and coupled with 3.08 parts of the coupling compound of example 4.

By successively operating as described in example 2, 5.8 parts of the dye:

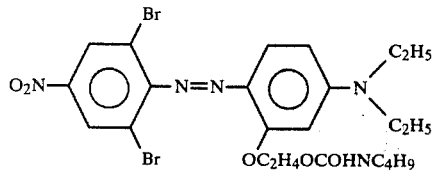

were obtained as a brown powder which dyed the abovesaid fibres reddish brown.

EXAMPLE 89

4.0 parts of the dye of example 88 were dissolved with 50 ml of dimethyl formamide and then heated to 60° C. 2.5 parts of CuCN were then added to the solution and the temperature was brought to 100° C. for about 4 hours. At the conclusion of the reaction the solution was hot filtered and poured into 400 ml of water; the dispersion was stirred 1 hour, whereupon it was filtered and repeatedly washed with water. After drying of the cake, 3.3 parts of the dye:

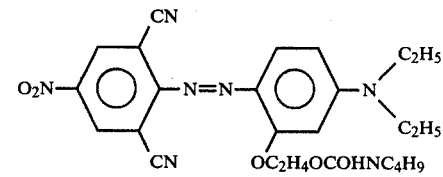

were obtained as a blue powder which dyed the above-mentioned fibres reddish blue.

EXAMPLE 90

2.06 parts of 2,6-dichloro-4-nitro aniline were diazotized according to the modalities of example 2 and coupled with 3.8 parts of the intermediate of example 1. It was then operated as illustrated in example 2, so obtaining 5.1 parts of the dye:

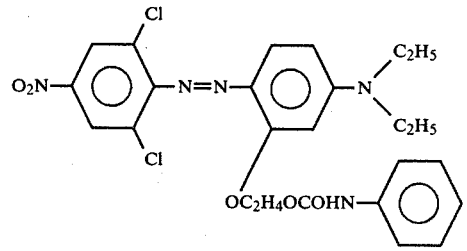

as a brown powder which dyed the above-mentioned fibres reddish brown.

EXAMPLE 91

2.06 parts of 2,6-dichloro-4-nitro aniline were diazotized according to the operative modalities of example 2 and coupled with 3.78 parts of the intermediate:

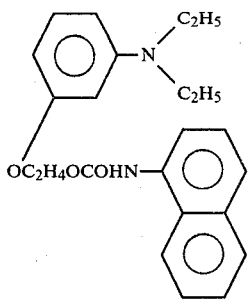

in 20 ml of acetic acid and 50 ml of water. By successively operating as illustrated in example 2, 5.7 parts of the dye:

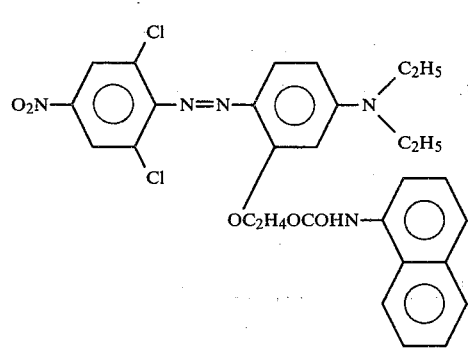

were obtained as a brown powder, which dyed the abovesaid fibres reddish brown.

EXAMPLE 92

2.92 parts of 2,6-dibromo-4-nitro aniline were diazotized and coupled, according to the modalities described in example 2, with 2.09 parts of the intermediate of example 22. By successively operating as described in example 1, 4.8 parts of the intermediate dye:

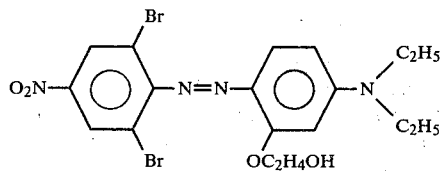

were obtained. 4.0 parts of such intermediate were reacted, according to the modalities of example 89, with 2.5 parts of CuCN and 50 ml of dimethyl formamide.

By successively operating as described in example 89, 3.4 parts of the intermediate dye:

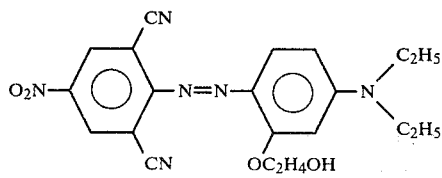

were obtained. 2.0 parts of the latter intermediate were reacted at 130° C. for 14 hours with 0.85 parts of naphthyl isocyanate in 30 ml of ortho-dichlorobenzene. At the conclusion of the reaction, the mass was allowed to cool to room temperature, it was filtered and washed with a little amount of petroleum ether. By means of drying, 2,7 parts of the dye:

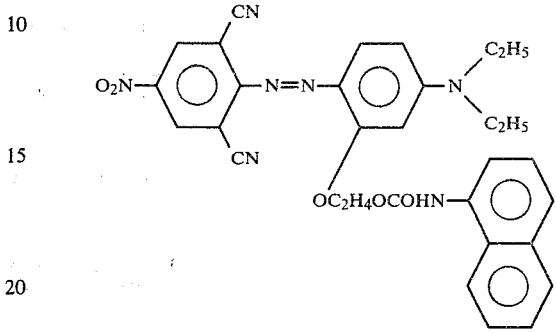

were recovered as a blue powder, which dyed the abovesaid fibres dark reddish blue.

EXAMPLE 93

1.38 parts of p-nitro aniline were dissolved in 4.0 ml of HCl, d=1.18, and 30 ml of water.

It was diazotized at 5°–10° C. by gradually adding a solution of 0.69 parts of sodium nitrite to 10 ml of water.

After clarification, the diazo solution was poured, at 5°–10° C., into a solution of 2.51 parts of coupling compound:

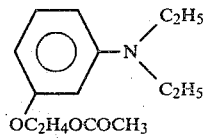

in 20 ml of acetic acid and 50 ml of water. During the coupling, the pH value was maintained equal to 4–5 by addition of sodium acetate in crystals.

After a 30-minute stirring at 5°–10° C. it was filtered, the precipitate was washed with water and it was dried. 3.8 parts of the dye:

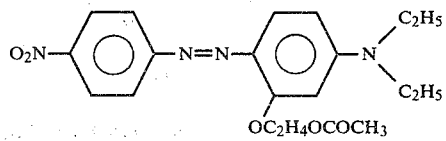

were recovered, which dyed red the synthetic fibres, in particular polyester fibres, cellulose acetate, polyamide fibres and polyacrylic fibres, the stabilities to sunlight, moisture and sublimation being good.

EXAMPLE 94

2.42 parts of 2-bromo-4-nitro-6-cyano aniline were added, at 0°–5° C. and in 1 hour, to a solution consisting of 0.69 parts of sodium nitrite in 20 ml of $H_2SO_4$, d=1.84.

After stirring for further 30 minutes the diazo solution was poured at 5°–10° C. into a solution of 2.51 parts of the coupling compound of example 1 in 20 ml of acetic acid and 50 ml of water.

During the coupling the pH value was maintained equal to 4–5 by addition of sodium acetate in crystals. After stirring for 1 hour at 5°–10° C. it was filtered and the precipitate was washed with water.

The cake was dried and 4.74 parts of the dye:

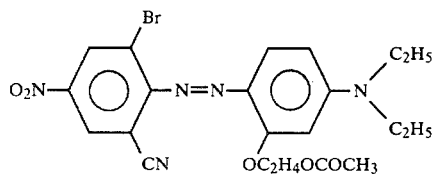

were so recovered, which dyed the above-mentioned fibres bluish violet.

EXAMPLE 95

1.62 parts of 3,4-dichloro aniline were hot treated with 4.0 ml of HCl (d=1.18) and 30 ml of water. After cooling of the solution to 5°–10° C., 0.69 parts of sodium nitrite in 10 ml of water were gradually added.

The diazo solution was then clarified and poured, at 5°–10° C., into a solution of 2.51 parts of the coupling compound of example 1 in acetic acid and water.

By successively operating according to example 1 it was possible to recover 3.9 parts of the dye:

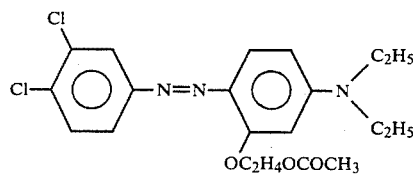

which dyed the fibres gold yellow.

EXAMPLE 96

1.83 parts of 2,4-dinitro aniline were diazotized and coupled with 2.51 parts of the coupling compound of example 1 by following the modalities of example 2.

4.2 parts of the dye:

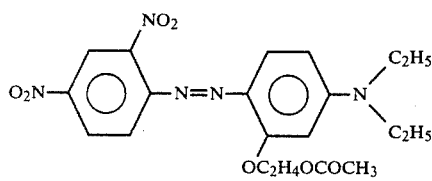

were recovered, which dyed the fibres violet.

EXAMPLE 97

1.73 parts of 2-chloro-4-nitro aniline were diazotized according to the modalities of example 3 and coupled with 3.13 parts of the coupling compound:

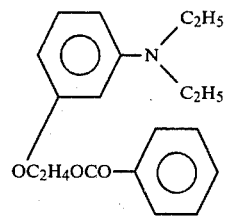

in 25 ml of acetic acid and 60 ml of water. By operating as described in example 1, 4.35 parts of the dye:

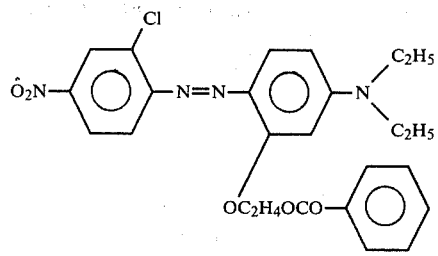

were recovered, which dyed the fibres bluish red.

EXAMPLE 98

1.38 parts of p-nitro aniline were diazotized according to the modalities of example 1 and coupled with 2.65 parts of the coupling compound:

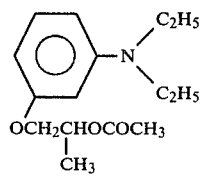

in 20 ml of acetic acid and 50 ml of water.

By operating as illustrated in example 1, 3.87 parts of the dye:

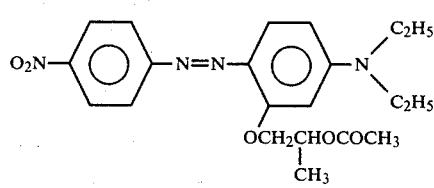

were recovered, which dyed the fibres red.

EXAMPLE 99

2.29 parts of 2-cyano-5-chloro aniline were diazotized according to the modalities indicated in example 2 and coupled with 2.65 parts of the coupling compound:

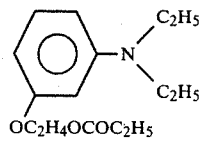

in a solution of acetic acid and water.

It was then operated according to the modalities of example 2, thus recovering 4.8 parts of the dye:

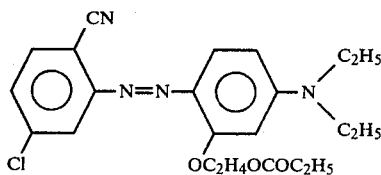

which dyed the fibres orange-red.

EXAMPLE 100

1.73 parts of 2-chloro-4-nitro aniline were diazotized according to the modalities described in example 3 and coupled with 2.79 parts of the coupling compound:

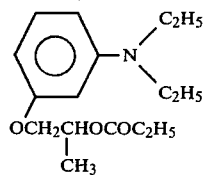

in a solution of acetic acid and water. By operating according to example 1, 4.35 parts of the dye:

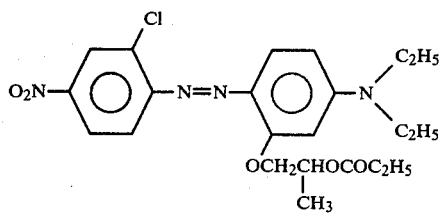

were recovered, which dyed the fibres bluish red.

EXAMPLE 101

2.42 parts of 2-bromo-4-nitro-6-cyano aniline were diazotized according to the modalities of example 2 and coupled with 2.79 parts of the coupling compound of example 8. By operating analogously with what described in example 2, 5.1 parts of the dye:

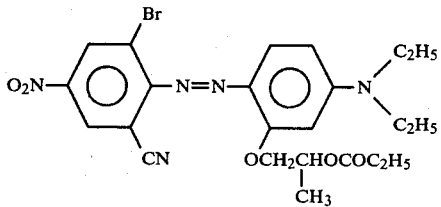

were recovered, which dyed the fibres bluish violet.

EXAMPLE 102

A solution of 1.63 parts of 2-cyano-4-nitro aniline in 20 parts of acetic acid, 4 parts of propionic acid and 2 parts of water was cooled to 5°-10° C., whereupon 10 ml of 1 N nitrosyl sulphuric acid were gradually added thereto.

After about 1 hour of further stirring at 5°-10° C., the diazo solution was slowly poured into a solution, at 5°-10° C., consisting of 2.51 parts of the coupling compound of example 1 in 20 ml of acetic acid and 50 ml of water.

During the coupling the pH value was maintained equal to 4-5 by addition of sodium acetate in crystals.

After a 1 hour stirring at 5°-10° C. it was filtered and the precipitate was washed with water. By drying of the cake, 3.95 parts of the dye:

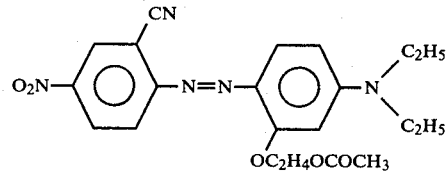

were recovered, which dyed the fibres violet.

EXAMPLE 103

A solution of 2.4 parts of 2,5-dichloro-4-methyl-sulphonyl aniline in 15 ml of $H_2SO_4$ (d=1.84) was cooled to 5°-10° C., and then gradually additioned with 10 ml of 1 N nitrosyl sulphuric acid. After a further 30-minute stirring, the diazo solution was poured into 2.65 parts of the coupling compound of example 7 in 20 ml of acetic acid and 50 ml of water.

It was then operated according to example 1, so recovering 4.85 parts of the dye:

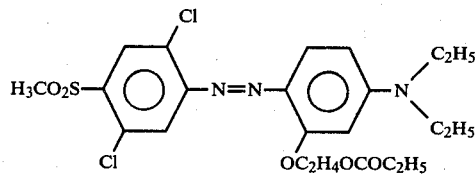

were recovered, which dyed the fibres yellowish red.

EXAMPLE 104

1.45 parts of 2-amino-5-nitro thiazole were batchwise added to 10 ml of $H_2SO_4$, d=1.84, cooled to 0°-5° C.

Into the resulting mixture 5 ml of 2N nitrosyl sulphuric acid were dropped, whereupon the whole was stirred for further 3 hours at 0°-5° C.

The diazo solution was then poured under stirring into 2.51 parts of the coupling compound of example 1 dissolved in dilute sulphuric acid, at 0°-5° C.

During the coupling the pH value was gradually brought to 4-5 by addition of a concentrated solution of sodium acetate. After a further 2-hour stirring, the whole was filtered, the precipitate was repeatedly washed with water and dried. It was possible to recover 3.45 parts of the dye:

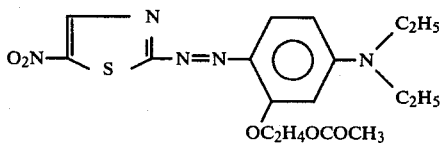

which dyed the fibres blue.

EXAMPLE 105

1.45 parts of 2-amino-5-nitro thiazole were diazotized and coupled, according to the modalities of example 12, with 2.65 parts of the coupling compound of example 6.

By operating according to example 12, 3.6 parts of the dye

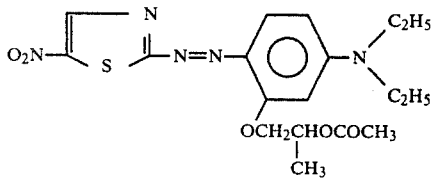

were recovered, which dyed the fibres blue.

EXAMPLE 106

2.37 parts of 3-(p-aminophenyl)-5-phenyl-1,2,4-oxadiazole were diazotized and coupled with 2.65 parts of the coupling compound of example 7 according to the modalities of example 2. 4.3 parts of the dye:

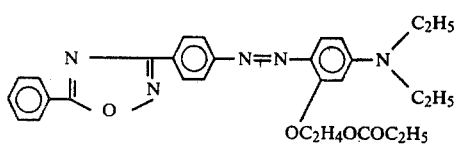

were recovered, which dyed the fibres orange.

EXAMPLE 107

2.48 parts of the ethyl ester of 5-amino-3-phenyl-2-thiazolecarboxylic acid were dissolved in 10 ml of $H_2SO_4$ (d=1.84), and the resulting solution was poured in about 1 hour into a solution of 0.69 parts of sodium nitrite in 15 ml of $H_2SO_4$ (d=1.84) at 0°–5° C.

After a further 30-minute stirring, the diazo solution was added to a solution of 2.79 parts of the coupling compound of example 8 in an acetic acid/water solution.

By successively operating according to the modalities of example 1, 5.1 parts of the dye:

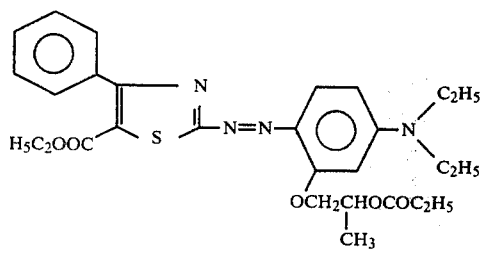

were recovered, which dyed the fibres ruby.

EXAMPLE 108

1.86 parts of 2- amino-4,5-thiazole dicarboxyamide were diazotized and coupled with 2.65 parts of the coupling compound of example 6, according to the modalities of example 15.

3.85 parts of the dye:

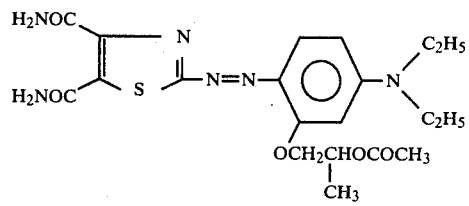

were recovered, which dyed the fibres red.

EXAMPLE 109

1.96 parts of the methyl ester of 5-amino-4-cyano-3 methyl-2-thiophene carboxylic acid were diazotized and coupled with 2.65 parts of the coupling compound of example 7 according to the modalities of example 15.

4.2 parts of the dye:

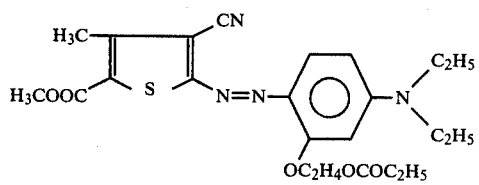

were recovered, which dyed the fibres violet.

EXAMPLE 110

2.66 parts of 2,3'-dichloro-4-amino azo benzene were diazotized according to the modalities of example 2 and coupled with 2.51 parts of the coupling compound of example 1 in an acetic acid/water solution.

By successively following the procedure of example 2, 4.75 parts of the dye:

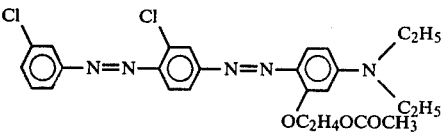

were recovered, which dyed the fibres ruby.

EXAMPLE 111

1.42 parts of 2-methyl-3-chloro aniline were diazotized and coupled according to the modalities of example 1 with 3.13 parts of the coupling compound of example 5.

By operating as described in example 1, 3.9 parts of the dye:

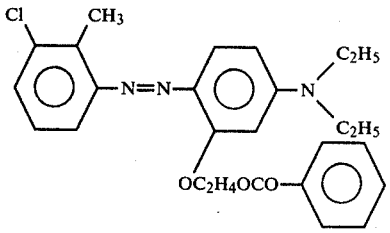

were recovered, which dyed the fibres yellow.

EXAMPLE 112

1.73 parts of 2-chloro-4-nitro aniline were diazotized according to the modalities of example 3 and coupled with 2.67 parts of the coupling compound:

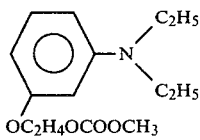

dissolved in 30 ml of acetic acid and 60 ml of water; during the coupling the pH value was maintained equal to 4–5 by addition of sodium acetate in crystals.

After filtration, washing and drying of the precipitate, 4.25 parts of the dye:

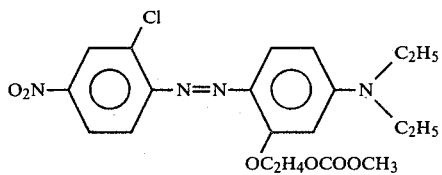

were recovered, which dyed the fibres bluish ruby.

EXAMPLE 113

2.25 parts of 4-amino azotoluene were treated at the boiling temperature with 10 ml of HCl (d=1.18) and 25 ml of water.

After cooling to 5°–10° C. and dilution of the mass, it was diazotized by gradually adding 0.69 parts of sodium nitrite in 10 ml of water.

After a further 1-hour stirring, the diazo solution was clarified and poured, at 5°–10° C., into a solution of 2.67 parts of the coupling compound of example 20 in 30 ml of acetic acid and 60 ml of water.

By operating as described in example 20, 4.6 parts of the dye:

were recovered, which dyed the fibres red.

EXAMPLE 114

1.62 parts of 2,5-dichloroaniline were diazotized according to the modalities of example 3 and coupled with 3.23 parts of the coupling compound:

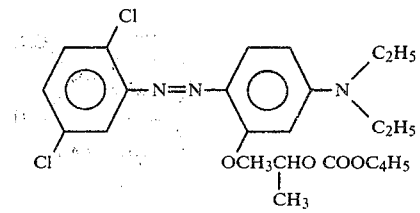

in 30 ml of acetic acid and 60 ml of water.

It was then operated according to example 1, so recovering 4.4 parts of the dye:

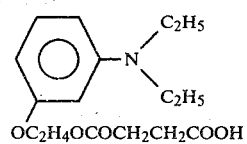

which dyed the fibres yellow.

EXAMPLE 115

1.62 parts of 3,4-dichloroaniline were diazotized according to the modalities of example 3 and coupled with 3.09 parts of the coupling compound:

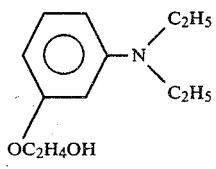

in 10 ml of acetic acid and 40 ml of water.

During the coupling, the pH value was maintained equal to 4–5 by addition of sodium acetate in crystals.

After filtering, washing and drying of the precipitate, 4.35 parts of the dye:

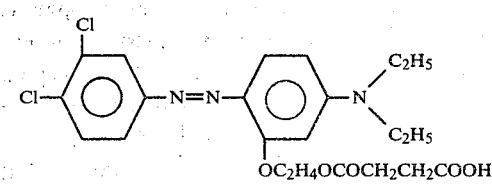

were recovered, which dyed the fibres gold yellow.

EXAMPLE 116

1.73 parts of 2-chloro-4-nitro aniline were diazotized and coupled according to the modalities of example 3 with 2.09 parts of the intermediate:

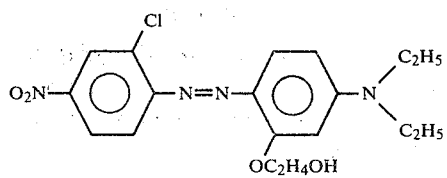

in 10 ml of acetic acid and 50 ml of water.

By successively operating as described in example 1 it was possible to recover 3.65 parts of the intermediate dye:

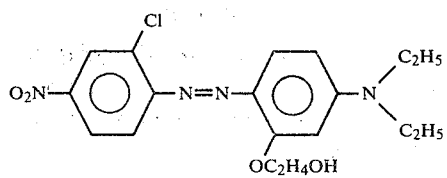

were recovered; 3.5 parts of such dye were reacted at 130° C. with 9.0 parts of acetic anhydride for about 30 minutes.

At the conclusion the mass was allowed to cool to room temperature, whereupon it was poured into 100 ml of water and was kept under stirring for 30 minutes.

It was filtered and the precipitate was washed and dried. 3.3 parts of the dye:

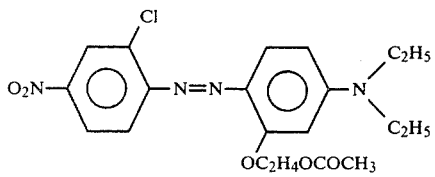

were recovered, which dyed the fibres bluish red.

EXAMPLE 117

1.38 parts of 3-nitro-aniline were diazotized and coupled, according to the modalities of example 1, with 2.23 parts of the intermediate:

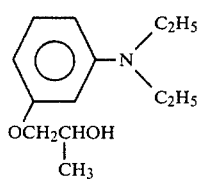

in an acetic acid/water solution. By operating according to example 1, 3.45 parts of the intermediate dye:

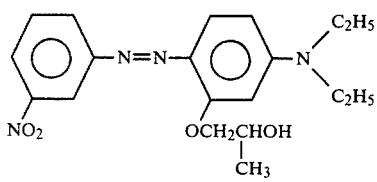

were recovered. 3.2 parts of such dye were treated at 140° C. for about 30 minutes with 10 parts of propionic anhydride. At the conclusion the mass was allowed to cool to room temperature, then it was poured into 100 ml of water and kept under stirring for 30 minutes.

After filtering, washing and drying of the precipitate, 3.1 parts of the dye

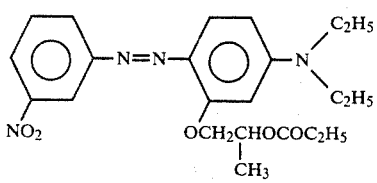

were recovered, which dyed the fibres orange.

EXAMPLE 118

2.62 parts of 2,4-dinitro-6-bromo aniline were diazotized and coupled, according to the modalities of example 10, with 2.09 parts of the intermediate of example 24. By operating according to example 1, 4.5 parts of the intermediate dye:

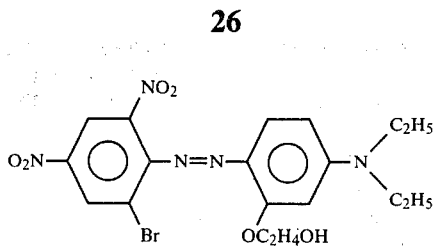

were recovered. 4.0 parts of such dye were dissolved with 10 ml of pyridine; the solution was cooled to 0°–10° C., whereupon 4.0 ml of butyl chloroformiate were gradually added thereto. The reaction was conducted at 0°–10° C. for 3 hours, whereupon the solution was poured into 100 ml of water. It was stirred for about 30 minutes, then it was filtered and repeatedly washed with water. By drying of the cake it was possible to recover 4.6 parts of the dye:

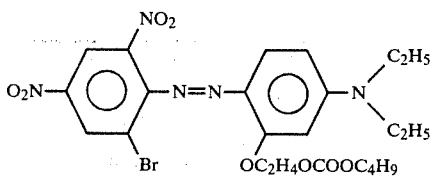

which dyed the fibres bluish violet.

EXAMPLE 119

2.29 parts of 2-cyano-5-chloro aniline were diazotized and coupled, according to the modalities of example 2, with 2.09 parts of the intermediate of example 24.

By operating as described in example 1, 4.2 parts of the intermediate dye:

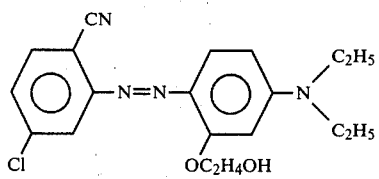

were recovered; 3.5 parts of such dye were reacted at 90° C. for 8 hours with 1.0 parts of succinic anhydride, 4 drops of pyridine in 25 ml of toluene.

At the conclusion of the reaction the mass was allowed to cool to room temperature, then it was filtered and dried. 3.9 parts of the dye:

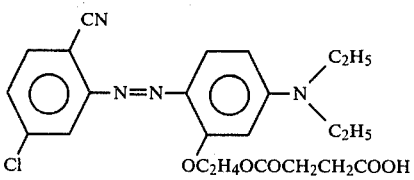

were recovered, which dyed the fibres orange red.

EXAMPLE 120

3.5 parts of the intermediate dye of example 27 were reacted with 1.6 parts of the chloride of 2-ethylhexanoic acid in the presence of 10 ml of othodichlorobenzene at 130° C. for 6 hours.

At the conclusion of the reaction the mass was allowed to cool to room temperature, whereupon it was filtered and the cake was dried. 4.4 parts of the dye:

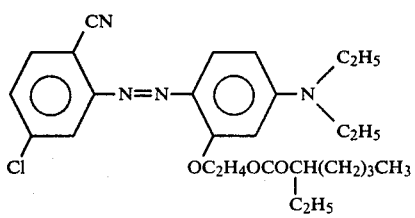

were obtained, which dyed the fibres orange red.

EXAMPLE 121

0.6 parts of the dye of example 1, previously microfined, were added to a dyeing bath at 40° C. containing 100 parts of a polyester yarn.

The pH was brought to 5 with acetic acid, then, employing a bath ratio=1:15, the bath was gradually heated to 130°–135° C. and dyeing was carried out at such temperature.

It was cooled down, the bath was discharged and the dyed material was subjected to the usual alkaline reducing cleaning treatment.

A dye exhibiting a red shade, characterized by good stabilities to moisture, to sunlight and to sublimation was obtained.

By operating in like manner as described in the preceding examples, the following azo dyes of general formula (I) wherein n is zero were obtained.

| Ex. No. | D—NH$_2$ | R | R$^1$ | R$^2$ | R$^3$ | X | Shade |
|---|---|---|---|---|---|---|---|
| 122 | 2-chloro-4-methylsulphonyl-aniline | CH$_3$ | C$_2$H$_5$ | C$_2$H$_5$ | H | C$_2$H$_4$ | scarlet |
| 123 | 3-chloro-aniline | C$_2$H$_5$ | C$_2$H$_5$ | C$_2$H$_5$ | H | CH$_2$CH(CH$_3$) | yellow |
| 124 | 4-amino-naphthalimide | C$_2$H$_5$ | C$_2$H$_5$ | C$_2$H$_5$ | H | C$_2$H$_4$ | violet |
| 125 | 4-chloro-6-methyl-sulphonyl-2-toluidine | C$_6$H$_5$ | C$_2$H$_5$ | C$_2$H$_5$ | H | CH$_2$CH(CH$_3$) | orange |
| 126 | 4-nitro-2-methylsulphonyl-aniline | OC$_4$H$_9$ | C$_2$H$_5$ | C$_2$H$_5$ | H | C$_2$H$_4$ | violet |
| 127 | 4-methylsulphonyl-aniline | OC$_3$H$_7$ | C$_2$H$_5$ | C$_2$H$_5$ | H | CH$_2$CH(CH$_3$) | orange |
| 128 | 2-methoxy-4-chloro aniline | OCH$_3$ | C$_2$H$_5$ | C$_2$H$_5$ | H | C$_2$H$_4$ | scarlet |
| 129 | 2-chloro-4-nitro-aniline | CH$_2$CH$_2$COOH | C$_2$H$_5$ | C$_2$H$_5$ | H | CH$_2$CH(CH$_3$) | ruby |
| 130 | 2-cyano-5-chloro-aniline | CH(C$_2$H$_5$)(CH$_2$)$_3$CH$_3$ | C$_2$H$_5$ | C$_2$H$_5$ | H | CH$_2$CH(CH$_3$) | scarlet |
| 131 | 2,4-dinitro aniline | CH$_2$CH$_2$COOH | C$_2$H$_5$ | C$_2$H$_5$ | H | C$_2$H$_4$ | violet |
| 132 | o-anisidine | C$_4$H$_9$ | C$_2$H$_5$ | C$_2$H$_5$ | H | C$_2$H$_4$ | yellow |
| 133 | methyl anthranilate | C$_3$H$_7$ | C$_2$H$_5$ | C$_2$H$_5$ | H | CH$_2$CH(CH$_3$) | orange |
| 134 | 2-chloro-4-nitro aniline | CH$_2$Cl | C$_2$H$_5$ | C$_2$H$_5$ | H | C$_2$H$_4$ | ruby |
| 135 | 4-anitro aniline | 2-C$_6$H$_4$COOH | C$_2$H$_5$ | C$_2$H$_5$ | H | C$_2$H$_4$ | red |
| 136 | 4-nitro aniline | CH=CHCOOH | C$_2$H$_5$ | C$_2$H$_5$ | H | C$_2$H$_4$ | red |
| 137 | 3-nitro aniline | OCH$_2$C$_6$H$_5$ | C$_2$H$_5$ | C$_2$H$_5$ | H | C$_2$H$_4$ | orange |
| 138 | 2,5-dichloro-4-methyl-sulphonyl aniline | C$_4$H$_9$ | C$_2$H$_5$ | C$_2$H$_5$ | H | C$_2$H$_4$ | red |
| 139 | 2,6-dibromo-4-nitro aniline | C$_2$H$_5$ | CH$_3$ | CH$_3$ | H | C$_2$H$_4$ | brownish red |
| 140 | 4-amino azobenzene | C$_2$H$_5$ | C$_2$H$_4$CN | C$_2$H$_4$CN | H | C$_2$H$_4$ | red |
| 141 | 4-phenylazo-2,5-dimethyl-aniline | C$_2$H$_5$ | C$_2$H$_4$Cl | C$_2$H$_4$Cl | H | C$_2$H$_4$ | red |
| 142 | 2-amino thiazole | OCH$_3$ | CH$_3$ | CH$_3$ | H | C$_2$H$_4$ | orange |
| 143 | 2-amino-5-nitro thiazole | CH$_3$ | CH$_3$ | CH$_3$ | H | CH$_2$CH(CH$_3$) | blue |
| 144 | 2-amino-5-nitro thiazole | CH$_2$CH$_2$COOH | C$_2$H$_5$ | C$_2$H$_5$ | H | CH$_2$CH(CH$_3$) | blue |
| 145 | 3-amino-1-phenyl-pyrazole | OC$_4$H$_9$ | C$_2$H$_5$ | C$_2$H$_5$ | H | C$_2$H$_4$ | yellow |
| 146 | 2-amino-benzothiazole | C$_2$H$_5$ | C$_2$H$_5$ | C$_2$H$_5$ | H | C$_2$H$_4$ | ruby |
| 147 | 2-amino-6-methylsulphonyl-benzothiazole | C$_4$H$_9$ | C$_2$H$_4$CN | C$_2$H$_4$CN | H | C$_2$H$_4$ | ruby |
| 148 | 4-nitro aniline | CH$_3$ | C$_2$H$_5$ | C$_2$H$_5$ | Cl | C$_2$H$_4$ | ruby |
| 149 | 4-nitro aniline | C$_2$H$_5$ | C$_2$H$_5$ | C$_2$H$_5$ | Cl | CH$_2$CH(CH$_3$) | ruby |
| 150 | 4-nitro aniline | OCH$_3$ | C$_2$H$_5$ | C$_2$H$_5$ | Cl | C$_2$H$_4$ | ruby |
| 151 | 4-nitro aniline | OC$_4$H$_9$ | C$_2$H$_5$ | C$_2$H$_5$ | Cl | CH$_2$CH(CH$_3$) | ruby |
| 152 | 4-nitro aniline | CH$_2$CH$_2$COOH | C$_2$H$_5$ | C$_2$H$_5$ | OCH$_3$ | C$_2$H$_4$ | violet |
| 153 | 4-nitro aniline | C$_6$H$_5$ | C$_2$H$_5$ | C$_2$H$_5$ | OCH$_3$ | C$_2$H$_4$ | violet |
| 154 | 4-nitro aniline | CH$_3$ | C$_2$H$_4$CN | C$_2$H$_4$CN | OCH$_3$ | C$_2$H$_4$ | violet |
| 155 | 4-nitro aniline | CH$_3$ | C$_2$H$_4$Cl | C$_2$H$_4$Cl | OC$_2$H$_5$ | C$_2$H$_4$ | violet |
| 156 | 4-nitro aniline | C$_2$H$_5$ | C$_2$H$_5$ | C$_2$H$_4$CN | H | C$_2$H$_4$ | red |
| 157 | 4-nitro-aniline | C$_2$H$_5$ | CH$_3$ | CH$_2$C$_6$H$_5$ | H | C$_2$H$_4$ | red |
| 158 | 4-nitro aniline | CH$_2$CH$_2$COOH | CH$_3$ | CH$_2$C$_6$H$_5$ | H | C$_2$H$_4$ | red |
| 159 | 4-nitro aniline | C$_6$H$_5$ | C$_2$H$_5$ | C$_2$H$_4$CN | OC$_2$H$_4$Cl | C$_2$H$_4$ | violet |
| 160 | 4-nitro aniline | OCH$_2$C$_6$H$_5$ | C$_2$H$_5$ | C$_2$H$_4$Cl | Cl | C$_2$H$_4$ | ruby |
| 161 | 4-nitro aniline | C$_2$H$_5$ | C$_3$H$_7$ | C$_3$H$_7$ | H | CH$_2$CH(CH$_3$) | red |
| 162 | 4-nitro aniline | C$_2$H$_5$ | C$_4$H$_9$ | C$_4$H$_9$ | H | CH$_2$CH(CH$_3$) | red |
| 163 | 4-nitro aniline | CH$_3$ | C$_2$H$_5$ | C$_2$H$_5$ | CH$_3$ | CH$_2$CH(CH$_3$) | ruby |
| 164 | 4-nitro aniline | CH=CHCOOH | CH$_3$ | CH$_3$ | OC$_2$H$_5$ | C$_2$H$_4$ | violet |
| 165 | 4-nitro aniline | C$_4$H$_9$ | CH$_3$ | CH$_2$C$_6$H$_5$ | OC$_2$H$_5$ | C$_2$H$_4$ | violet |

-continued

| Ex. No. | D—NH$_2$ | R | R$^1$ | R$^2$ | R$^3$ | X | Shade |
|---|---|---|---|---|---|---|---|
| 166 | 4-nitro aniline | C$_2$H$_5$ | C$_2$H$_5$ | C$_2$H$_5$ | OC$_4$H$_9$ | C$_2$H$_4$ | violet |
| 167 | 4-nitro aniline | C$_2$H$_5$ | C$_2$H$_5$ | C$_2$H$_5$ | OC$_2$H$_4$Cl | C$_2$H$_4$ | violet |
| 168 | 2-amino-5-nitro thiazole | C$_2$H$_5$ | C$_2$H$_5$ | C$_2$H$_5$ | Cl | C$_2$H$_4$ | blue |
| 169 | 8-amino quinoline | C$_2$H$_5$ | C$_2$H$_5$ | C$_2$H$_5$ | H | C$_2$H$_4$ | orange |
| 170 | 2-amino-6-ethoxy benzothiazole | C$_6$H$_5$ | C$_2$H$_5$ | C$_2$H$_5$ | Cl | C$_2$H$_4$ | blue |
| 171 | 2-amino-6-chloro benzothiazole | C$_4$H$_9$ | C$_2$H$_5$ | C$_2$H$_5$ | OCH$_3$ | C$_2$H$_4$ | blue |
| 172 | 2,4,5-trichloro aniline | C$_2$H$_5$ | CH$_3$ | CH$_3$ | Cl | C$_2$H$_4$ | orange |
| 173 | 4-phenylazo-2-anisidine | OC$_4$H$_9$ | C$_2$H$_5$ | C$_2$H$_5$ | H | C$_2$H$_4$ | red |
| 174 | 2,5-dichloro-4-dimethylamino sulphonyl-aniline | C$_2$H$_5$ | C$_2$H$_4$CN | C$_2$H$_4$CN | H | C$_2$H$_4$ | red |
| 175 | 4-nitro aniline | OCH$_2$C$_6$H$_5$ | C$_2$H$_5$ | C$_2$H$_5$ | OC$_2$H$_4$Cl | C$_2$H$_4$ | violet |
| 176 | 4-nitro aniline | C$_7$H$_{15}$ | C$_2$H$_5$ | C$_2$H$_4$CN | Cl | C$_2$H$_4$ | ruby |
| 177 | 4-nitro aniline | 2-C$_6$H$_4$—COOH | C$_2$H$_5$ | C$_2$H$_5$ | H | C$_2$H$_4$ | red |
| 178 | 4-nitro aniline | CH$_2$CN | C$_2$H$_5$ | C$_2$H$_5$ | H | C$_2$H$_4$ | red |
| 179 | 4-nitro aniline | C$_2$H$_4$Cl | C$_2$H$_5$ | C$_2$H$_5$ | H | C$_2$H$_4$ | red |
| 180 | 4-nitro aniline | OC$_2$H$_4$Br | C$_2$H$_5$ | C$_2$H$_5$ | H | C$_2$H$_4$ | red |
| 181 | 4-nitro aniline | 4-C$_6$H$_4$Cl | C$_2$H$_5$ | C$_2$H$_5$ | H | C$_2$H$_4$ | red |
| 182 | 4-nitro aniline | CH$_2$CH$_2$CH$_2$Cl | C$_2$H$_5$ | C$_2$H$_5$ | H | C$_2$H$_4$ | red |
| 183 | 4-nitro aniline | OC$_6$H$_5$ | C$_2$H$_5$ | C$_2$H$_5$ | H | C$_2$H$_4$ | red |
| 184 | α-amino anthraquinone | C$_2$H$_5$ | C$_2$H$_5$ | C$_2$H$_5$ | H | CH$_2$CH(CH$_3$) | red |
| 185 | β-amino anthraquinone | CH$_3$ | C$_2$H$_5$ | C$_2$H$_5$ | H | C$_2$H$_4$ | red |

EXAMPLE 186

2.92 parts of 2,6-dibromo-4-nitro aniline were diazotized according to the modalities described in example 2, and coupled with 2.65 parts of the coupling compound of example 99.

By successively operating as specified in example 2, 5.4 parts of the dye:

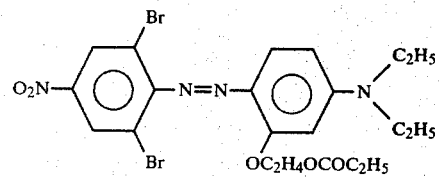

were recovered, which dyed the fibres reddish brown.

EXAMPLE 187

2.92 parts of 2,6-dibromo-4-nitro aniline were diazotized according to the modalities of example 2 and coupled with 2.65 parts of the coupling compound of example 98.

It was then operated as described in example 2, thus recovering 5.3 parts of the dye:

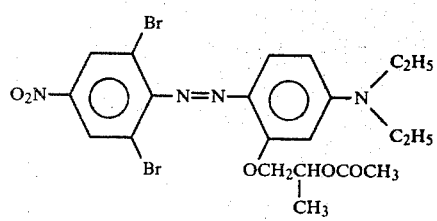

—which dyed the fibres reddish brown.

EXAMPLE 188

4.0 parts of the dye of example 186 were dissolved with 50 ml of dimethyl formamide and then heated to 60° C. The solution was additioned with 2.5 parts of CuCN and the temperature was brought to 100° C. for 4 hours. At the conclusion of the reaction, the solution was hot filtered and poured into 400 ml of water; the dispersion was stirred for 1 hour, whereupon it was filtered and repeatedly washed with water.

After drying of the cake, 3.4 parts of the dye:

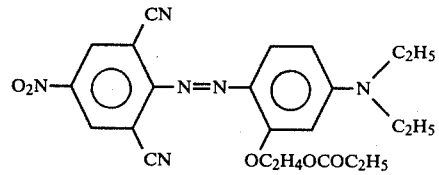

were recovered, which dyed the fibres reddish blue.

EXAMPLE 189

By operating exactly as described in example 188 and using 4.0 parts of the dye described in example 187, 3.2 parts of the dye:

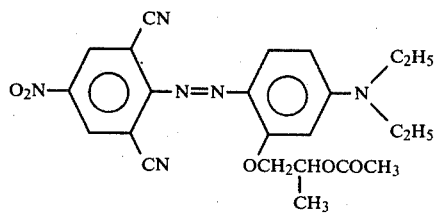

were recovered, which dyed the fibres reddish blue.

EXAMPLE 190

2.06 parts of 2,6-dichloro-4-nitro aniline were diazotized according to the modalities illustrated in example 2 and coupled with 2.09 parts of the intermediate of example 116. By successively operating as described in example 1, 3.9 parts of the intermediate dye:

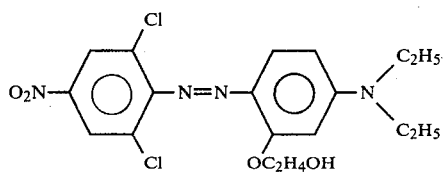

were recovered.

3.0 parts of such intermediate were reacted with 10 parts of acetic anhydride at 140° C. for about 10 minutes. By successively operating as described in example 116, 2.8 parts of the dye:

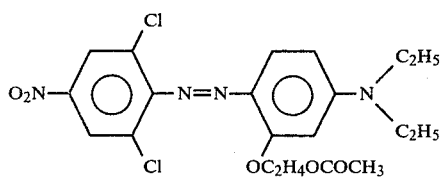

were recovered, which dyed the fibres reddish brown.

EXAMPLE 191

30 parts of the intermediate dye of example 190 were reacted at 80° C. for 8 hours with 0.7 parts of triethylamine and 1.6 parts of benzoic anhydride in 20 ml of dimethyl formamide. At the conclusion of the reaction the mass was allowed to cool down to room temperature, then it was poured into 150 ml of water and was stirred for 1 hour. The resulting precipitate was filtered, washed and dried. 3.4 parts of the dye:

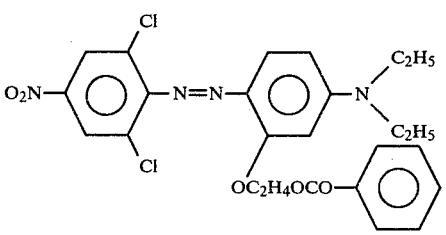

were obtained, which dyed the fibres reddish brown.

EXAMPLE 192

2.62 parts of 2,4-dinitro-6-bromo aniline were diazotized according to the modalities illustrated in example 2 and coupled with 2.09 parts of the intermediate of example 116.

By successively operating as described in example 1, 4.5 parts of the intermediate dye:

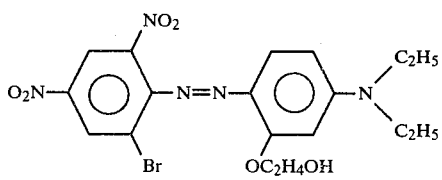

were recovered; 4.0 parts of such intermediate were reacted, according to the modalities of example 188, with 1.5 parts of CuCN in 30 ml of DMF.

By successively operating as illustrated in example 188 3.6 parts of the intermediate dye:

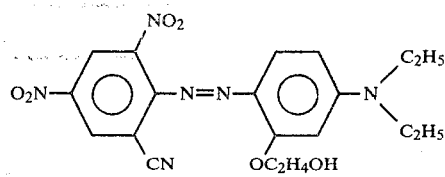

were obtained. 2.0 parts of the latter intermediate were further reacted with 10 parts of acetic anhydride at 140° C. for 20 minutes.

By successively operating as described in example 116, 2.1 parts of the dye:

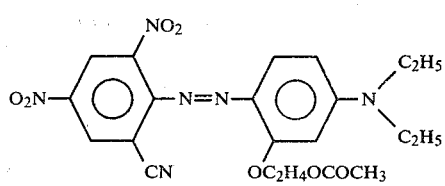

were obtained, which dyed the fibres reddish blue.

EXAMPLE 193

2.0 parts of the second intermediate dye of example 192 were reacted, according to the modalities of example 191, with 0.7 parts of triethylamine and 1.6 parts of benzoic anhydride in 20 ml of dimethyl formamide. By successively operating as described in example 191, 2.3 parts of the dye:

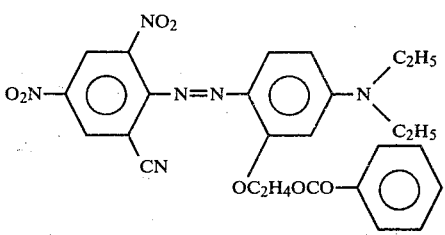

were obtained, which dyed the fibres reddish blue.

What we claim is:

1. Azo dyes of general formula:

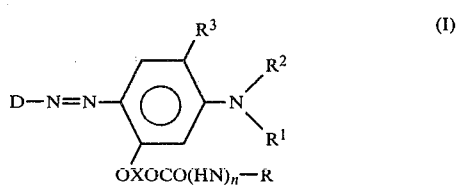

wherein:

D is selected from the group consisting of the residues of diazotizable components of the carbocyclic or heterocyclic series and said residues substituted by halogen, trifluoromethyl, CN, $NO_2$, $C_1$-$C_4$ alkyl, NHCO alkyl $C_1$-$C_4$, $SO_2NH_2$, $SO_2$ alkyl $C_1$-$C_4$, $SO_2NH$ alkyl $C_1$-$C_4$, $SO_2N$ (alkyl $C_1$-$C_4$)$_2$, $SO_2NH$ phenyl, hydroxyethoxy, chloroethoxy, methoxyethoxy, COO alkyl $C_1$-$C_4$, COO cycloalkyl, phenyl, phenoxy, phenylazo or naphthylazo;

X is selected from the group consisting of the ethylene group or an ethylene group substituted by halogen, methyl, $C_1$-$C_4$ alkyl, aryl, aralkyl and CH₂OCO(HN)ₙR in which R and n have the meanings defined below;

R is selected from the group consisting of C₁–C₈ alkyl, C₁–C₈ alkyl substituted by halogen, CN or COOH, C₂–C₈ alkenyl, C₂–C₈ alkenyl substituted by halogen, CN or COOH, aryl, aryl substituted by one or more halogens, C₁–C₄ alkyl or C₁–C₄ alkoxyl, C₁–C₈ alkoxy, aryloxy, cycloalkoxy, aralkoxy, naphthyl, or naphthyl substituted by halogen, CN or COOH, or aralkyl;

R¹ and R² which are the same or different, are C₁–C₄ alkyl, C₁–C₄ alkyl substituted by halogen or CN, or aralkyl;

R³ is hydrogen, halogen, C₁–C₄ alkyl, substituted C₁–C₄ alkyl, C₁–C₄ alkoxyl or substituted C₁–C₄ alkoxyl; and n is zero or 1.

2. A dye according to claim 1 and having the formula:

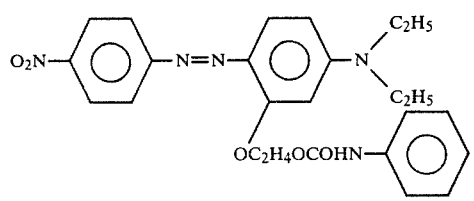

3. A dye according to claim 1 and having the formula:

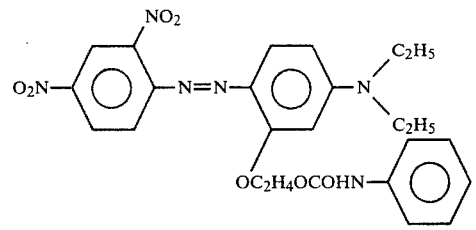

4. A dye according to claim 1 and having the formula:

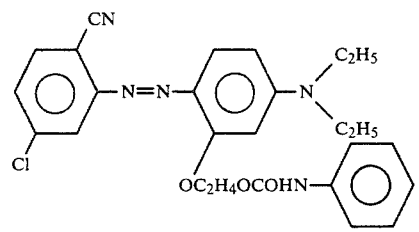

5. A dye according to claim 1 and having the formula:

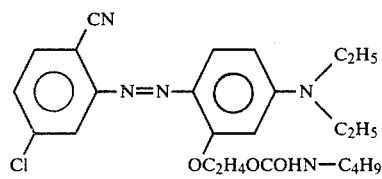

6. A dye according to claim 1 and having the formula:

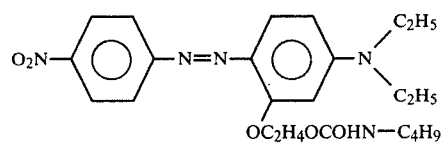

7. A dye according to claim 1 and having the formula:

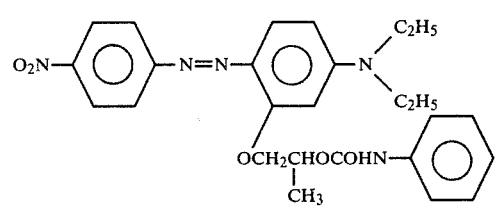

8. A dye according to claim 1 and having the formula:

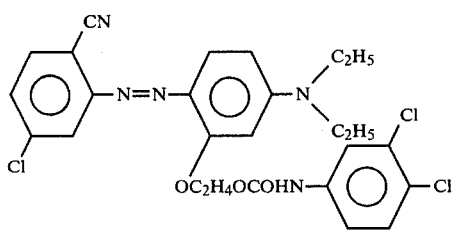

9. A dye according to claim 1 and having the formula:

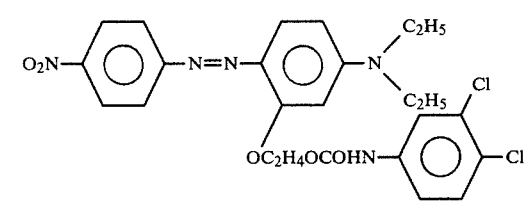

10. A dye according to claim 1 and having the formula:

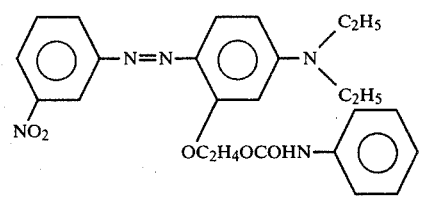

11. A dye according to claim 1 and having the formula:

12. A dye according to claim 1 and having the formula:

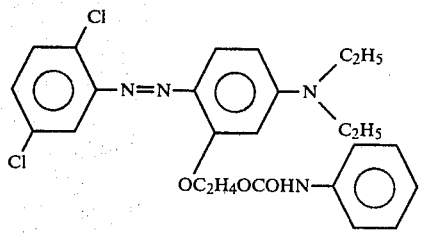

13. A dye according to claim 1 and having the formula:

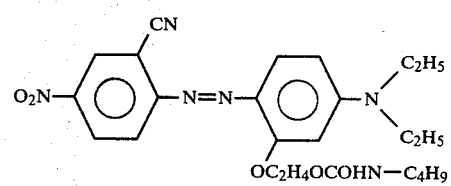

14. A dye according to claim 1 and having the formula:

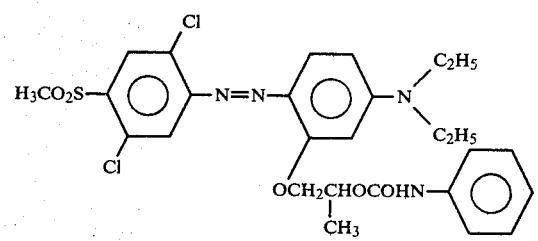

15. A dye according to claim 1 and having the formula:

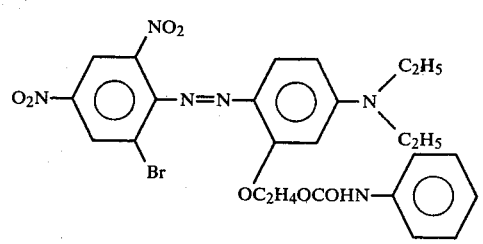

16. A dye according to claim 1 and having the formula:

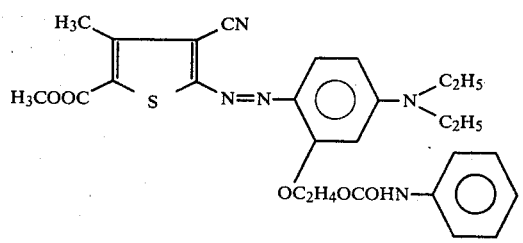

17. A dye according to claim 1 and having the formula:

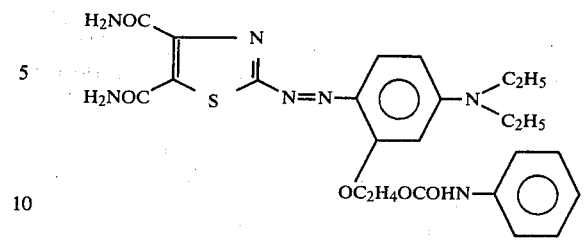

18. A dye according to claim 1 and having the formula:

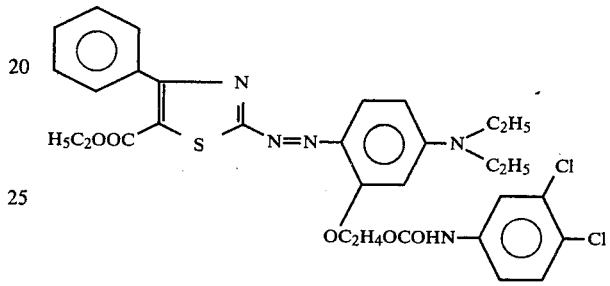

19. A dye according to claim 1 and having the formula:

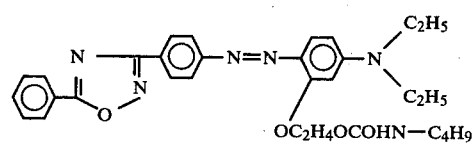

20. A dye according to claim 1 and having the formula:

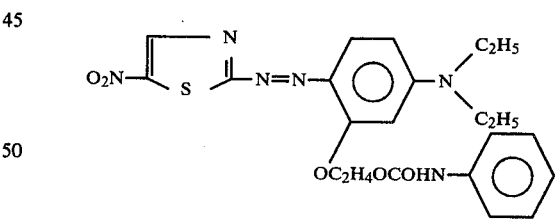

21. A dye according to claim 1 and having the formula:

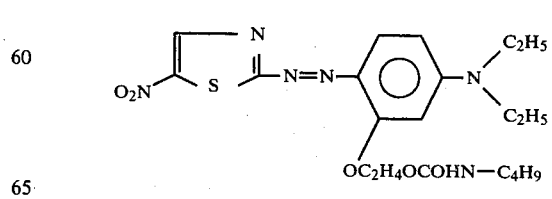

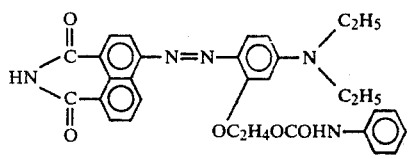

22. A dye according to claim 1 and having the formula:

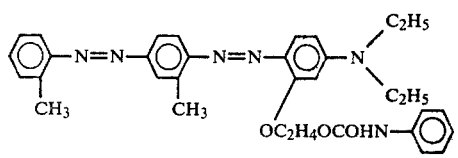

23. A dye according to claim 1 and having the formula:

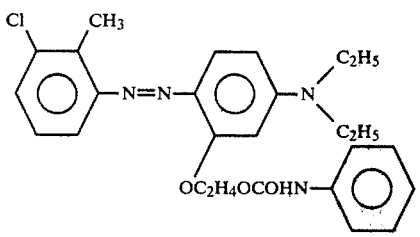

24. A dye according to claim 1 and having the formula:

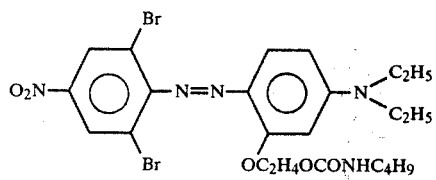

25. A dye according to claim 1 and having the formula:

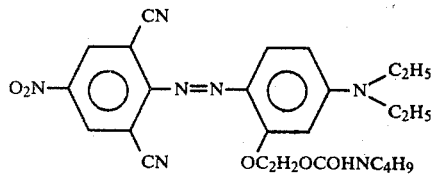

26. A dye according to claim 1 and having the formula:

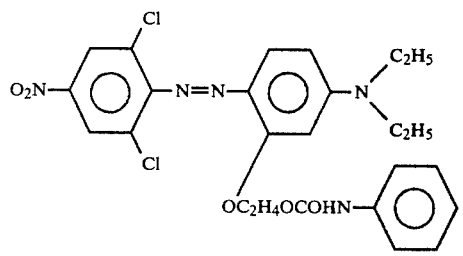

27. A dye according to claim 1 and having the formula:

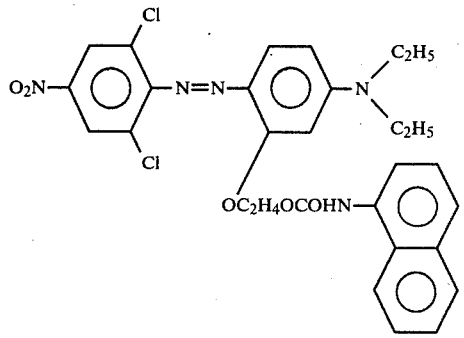

28. A dye according to claim 1 and having the formula:

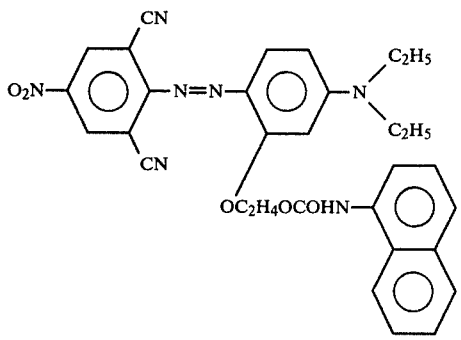

29. A dye according to claim 1 and having the formula:

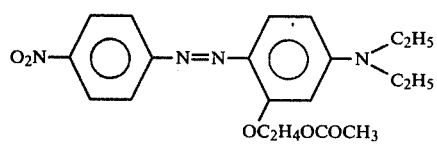

30. A dye according to claim 1 and having the formula:

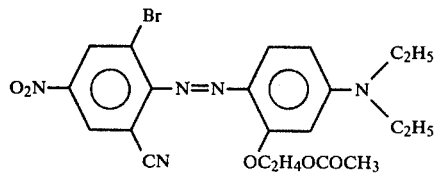

31. A dye according to claim 1 and having the formula:

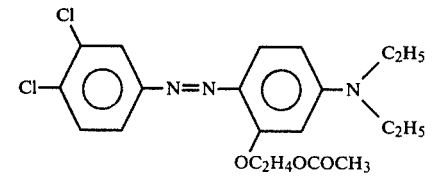

32. A dye according to claim 1 and having the formula:

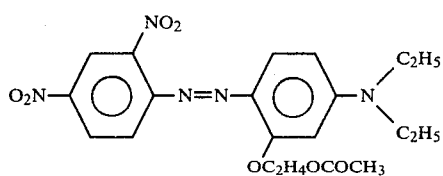

33. A dye according to claim 1 and having the formula:

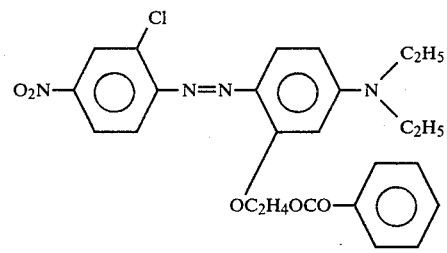

34. A dye according to claim 1 and having the formula:

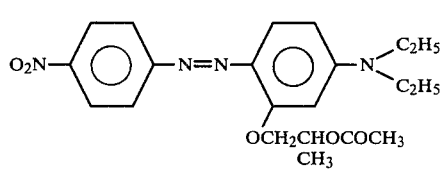

35. A dye according to claim 1 and having the formula:

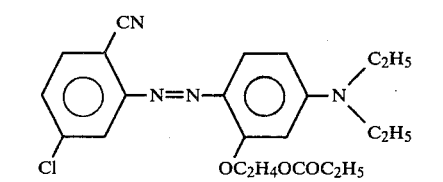

36. A dye according to claim 1 and having the formula:

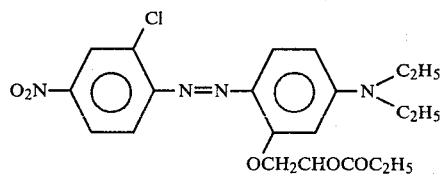

37. A dye according to claim 1 and having the formula:

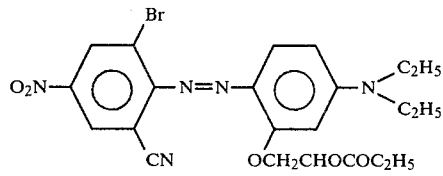

38. A dye according to claim 1 and having the formula:

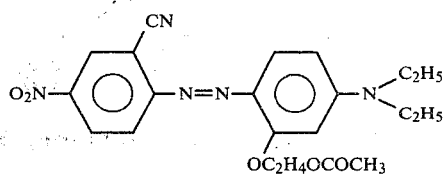

39. A dye according to claim 1 and having the formula:

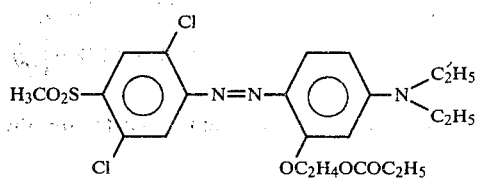

40. A dye according to claim 1 and having the formula:

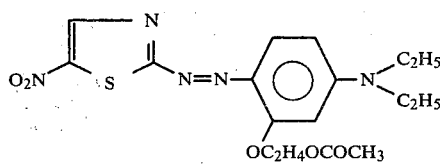

41. A dye according to claim 1 and having the formula:

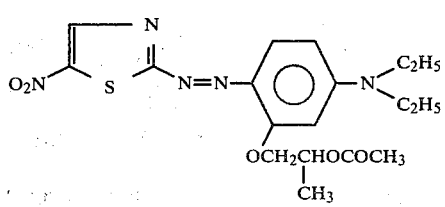

42. A dye according to claim 1 and having the formula:

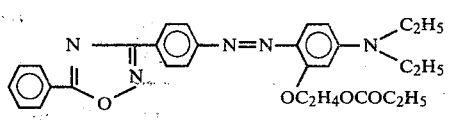

43. A dye according to claim 1 and having the formula:

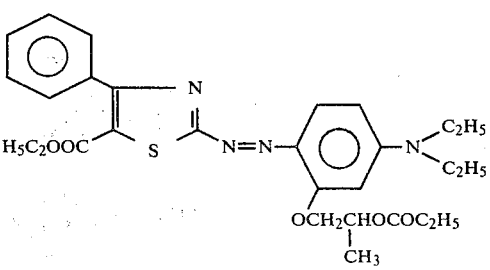

44. A dye according to claim 1 and having the formula:

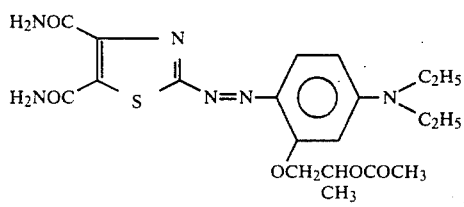

45. A dye according to claim 1 and having the formula:

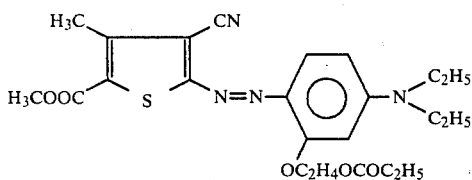

46. A dye according to claim 1 and having the formula:

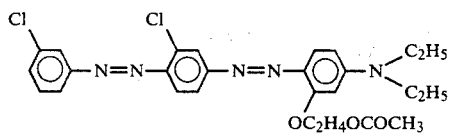

47. A dye according to claim 1 and having the formula:

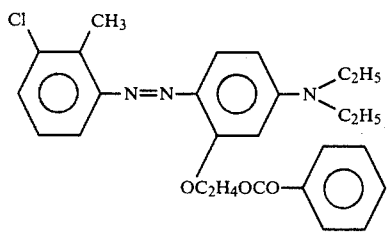

48. A dye according to claim 1 and having the formula:

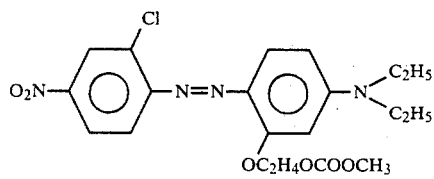

49. A dye according to claim 1 and having the formula:

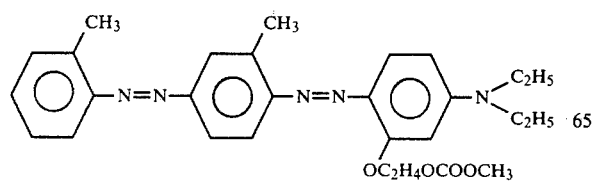

50. A dye according to claim 1 and having the formula:

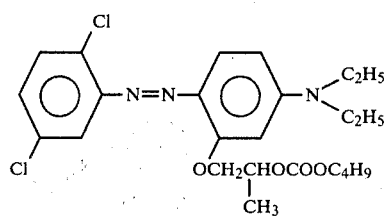

51. A dye according to claim 1 and having the formula:

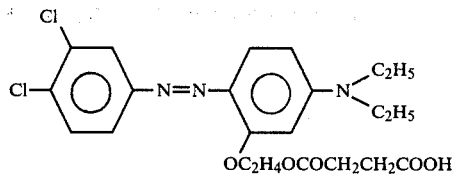

52. A dye according to claim 1 and having the formula:

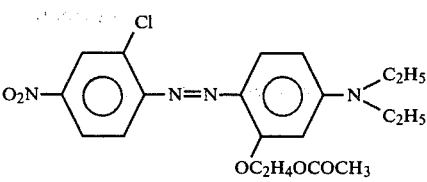

53. A dye according to claim 1 and having the formula:

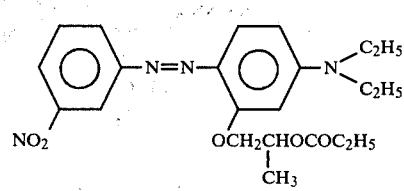

54. A dye according to claim 1 and having the formula:

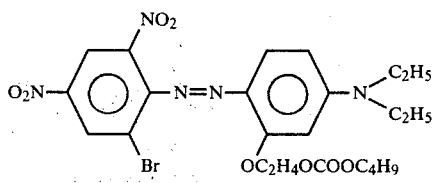

55. A dye according to claim 1 and having the formula:

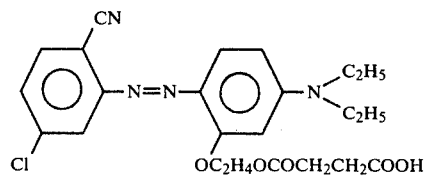

56. A dye according to claim 1 and having the formula:

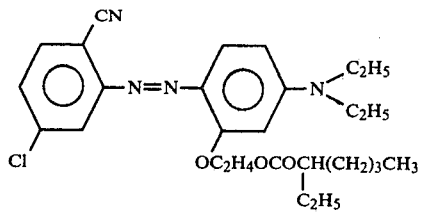

57. A dye according to claim 1 and having the formula:

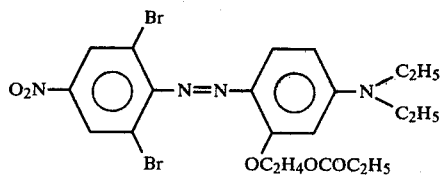

58. A dye according to claim 1 and having the formula:

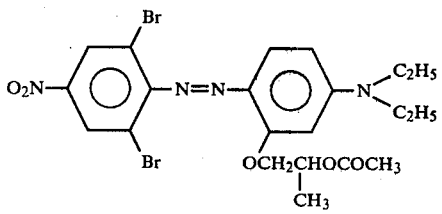

59. A dye according to claim 1 and having the formula:

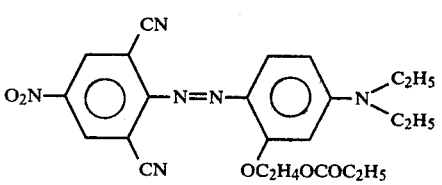

60. A dye according to claim 1 and having the formula:

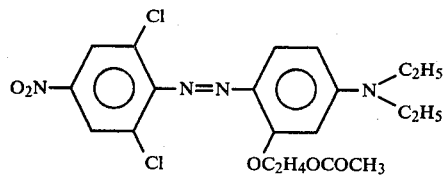

61. A dye according to claim 1 and having the formula:

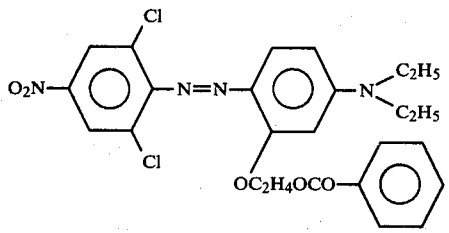

62. A dye according to claim 1 and having the formula:

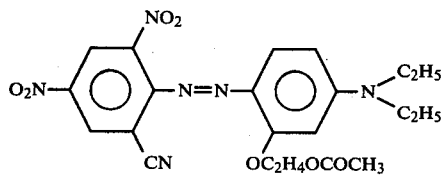

63. A dye according to claim 1 and having the formula:

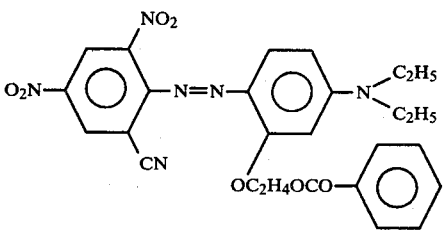

64. A dye according to claim 1 and having the formula:

65. Synthetic polymeric materials dyed or printed with dyes according to claim 1.

* * * * *

UNITED STATES PATENT AND TRADEMARK OFFICE
CERTIFICATE OF CORRECTION

PATENT NO. : 4,257,942
DATED : March 24, 1981
INVENTOR(S) : Francesco De FEO et al It is certified that error appears in the above—identified patent and that said Letters Patent is hereby corrected as shown below:

[57] - line 5 of the formula "OXO(CO(HN)$_n$-R" should read

- - - OXO CO(HN)$_n$-R - - -.

Col. 2 - line 64 - "4amine ethyl benzoate," should read

- - - 4-amino ethyl benzoate, - - -.

Col. 3 - lines 26 - 27 - "diethyl ester of 5amino-3-methyl- 2,4-thiophene-dicarboxylicacid," should read

- - - diethyl ester of 5-amino-3-methyl-2,4- thiophene-dicarboxylic acid, - - -.

Col. 8 - line 66 - "couled" should read - - - coupled - - -, line 67 - "examples 2," should read - - - example 2 - - -.

UNITED STATES PATENT AND TRADEMARK OFFICE
CERTIFICATE OF CORRECTION

PATENT NO. : 4,257,942            Page 2 of 2
DATED : March 24, 1981
INVENTOR(S) : Francesco De FEO et al It is certified that error appears in the above—identified patent and that said Letters Patent is hereby corrected as shown below:

Col. 24 — <u>last line, 2nd formula</u> — "$OCH_3\underset{\underset{CH_3}{|}}{C}HO\ COOC_4H_5$"
              <u>Example 114</u> should read

- - - $OCH_2\underset{\underset{CH_3}{|}}{C}HO\ COOC_4H_9$ - - - .

Signed and Sealed this

Twenty-fifth Day of August 1981

[SEAL]

Attest:

Attesting Officer

GERALD J. MOSSINGHOFF

Commissioner of Patents and Trademarks